(12) United States Patent
Kim et al.

(10) Patent No.: US 11,143,503 B2
(45) Date of Patent: Oct. 12, 2021

(54) INTERFEROMETRIC WAVINESS DETECTION SYSTEMS

(71) Applicant: Kimball Electronics Indiana, Inc., Jasper, IN (US)

(72) Inventors: Sangtaek Kim, Dublin, CA (US); Yan Cheng, San Jose, CA (US)

(73) Assignee: Kimball Electronics Indiana, Inc., Jasper, IN (US)

( * ) Notice: Subject to any disclaimer, the term of this patent is extended or adjusted under 35 U.S.C. 154(b) by 49 days.

(21) Appl. No.: 16/222,636

(22) Filed: Dec. 17, 2018

(65) Prior Publication Data
US 2020/0049492 A1    Feb. 13, 2020

Related U.S. Application Data

(60) Provisional application No. 62/715,783, filed on Aug. 7, 2018.

(51) Int. Cl.
    *G01B 11/24*    (2006.01)
    *G01B 9/02*     (2006.01)
    (Continued)

(52) U.S. Cl.
    CPC ........ *G01B 11/2441* (2013.01); *G01B 9/0203* (2013.01); *G01B 9/02016* (2013.01);
    (Continued)

(58) Field of Classification Search
    CPC ... G01B 11/306; G01B 11/30; G01B 11/2441; G01B 9/02015; G01B 9/02024; G01B 9/0238; G01B 9/02034–9/02039
    (Continued)

(56) References Cited

U.S. PATENT DOCUMENTS

| | | | |
|---|---|---|---|
| 6,847,458 B2 * | 1/2005 | Freischlad | G01B 11/06 356/503 |
| 7,570,366 B2 | 8/2009 | LeBlanc | |

(Continued)

FOREIGN PATENT DOCUMENTS

| | | |
|---|---|---|
| CN | 1977144 A | 6/2007 |
| CN | 100552376 C | 10/2009 |

(Continued)

OTHER PUBLICATIONS

Office Action dated Jun. 11, 2020 in corresponding Taiwan Patent Application No. 108123580.
(Continued)

*Primary Examiner* — Michael P LaPage
(74) *Attorney, Agent, or Firm* — Faegre Drinker Biddle & Reath LLP

(57) ABSTRACT

An interferometer detection system, including a beam splitter receiving a collimated light signal and splitting the signal into a first light signal and a second light signal. The system includes a first mirror receiving and reflecting the first light signal along a first path. The system includes a second mirror receiving and reflecting the second light signal along a second path via a transparent material. The system includes a 2D photosensor array configured to receive from the beam splitter the reflected first light signal merged with the reflected second light signal double passing through the transparent material and configured to generate an interference fringe pattern. A non-sinusoidal interference fringe pattern indicates geometrical variation between a wavefront of the reflected first light signal along the first path and a wavefront of the reflected second light signal double passing through the transparent material along the second path.

15 Claims, 17 Drawing Sheets

(51) Int. Cl.
*G02B 27/14* (2006.01)
*G01B 11/30* (2006.01)
*G09G 3/00* (2006.01)

(52) U.S. Cl.
CPC .......... *G01B 9/02024* (2013.01); *G01B 11/30* (2013.01); *G01B 11/303* (2013.01); *G02B 27/144* (2013.01); *G09G 3/006* (2013.01); *G01B 2290/70* (2013.01)

(58) Field of Classification Search
USPC ....................................................... 356/515
See application file for complete search history.

(56) References Cited

U.S. PATENT DOCUMENTS

| | | | |
|---|---|---|---|
| 7,796,273 | B2 | 9/2010 | Deck |
| 10,042,173 | B2 | 8/2018 | Hung et al. |
| 2002/0118370 | A1* | 8/2002 | Nishida .............. G01M 11/0271 356/515 |
| 2002/0145739 | A1* | 10/2002 | De Groot ................ G01B 11/06 356/503 |
| 2002/0167674 | A1* | 11/2002 | Yoshizumi ........... G01B 11/306 356/492 |
| 2006/0139656 | A1* | 6/2006 | Kulawiec ............ G01B 9/02027 356/512 |
| 2008/0285019 | A1* | 11/2008 | Williby .............. G01B 9/02072 356/127 |
| 2012/0147379 | A1* | 6/2012 | Choi ...................... G01N 21/21 356/453 |
| 2014/0313517 | A1* | 10/2014 | Vankerkhove ..... G01M 11/0271 356/513 |
| 2019/0316898 | A1* | 10/2019 | Kim ................... G01B 11/2441 |

FOREIGN PATENT DOCUMENTS

| | | |
|---|---|---|
| CN | 101680742 A | 3/2010 |
| CN | 103712573 A | 4/2014 |
| EP | 1153263 | 12/2004 |
| TW | 200902960 | 1/2009 |
| TW | I401414 | 7/2013 |
| TW | I596448 | 8/2017 |
| WO | 2001/51886 | 7/2001 |

OTHER PUBLICATIONS

Notice of Preliminary Rejection dated Jul. 29, 2020 in corresponding Korean Patent Application No. 10-2019-0088184.

\* cited by examiner

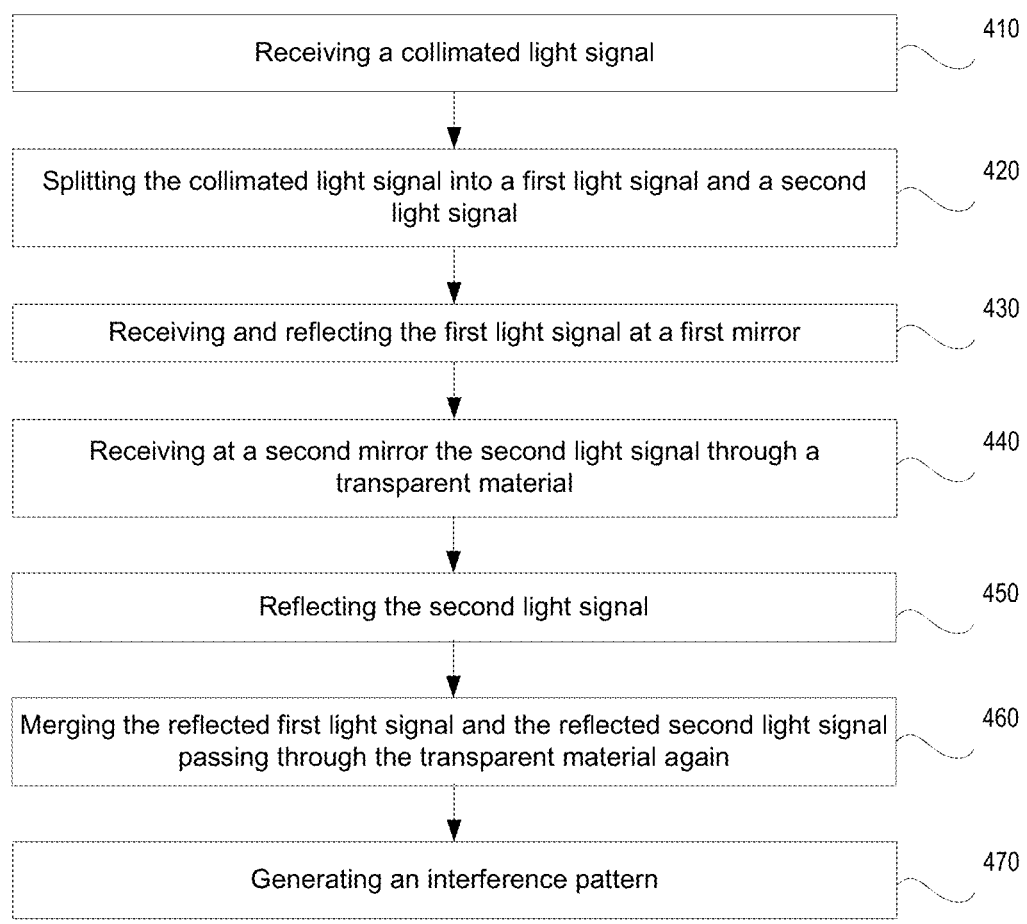

INTERFEROMETRIC WAVINESS DETECTION SYSTEMS

CLAIM OF PRIORITY

The present application claims priority to and the benefit of commonly owned U.S. Provisional Patent Application Ser. No. 62/715,783, filed on Aug. 7, 2018, entitled "Interferometric Waviness Detection System," which is herein incorporated by reference in its entirety.

TECHNICAL FIELD

The present invention relates generally to testing and detecting waviness (surface/refractive index irregularity) of flat transparent optical elements and displays, and more specifically to cover glass for displays and assembled display modules.

BACKGROUND

The waviness of a flat panel display is an important parameter for providing insight into lamination process control and for providing an indication of final product quality. It is becoming increasingly important for the display module to have absolute flatness quality. Any irregular pattern (waviness) can be seen by a corresponding user, especially if seen at a specific angle. An irregular pattern will consequently degrade the user experience.

The background description provided herein is for the purposes of generally presenting the context of the disclosure. Work of the presently named inventors, to the extent it is described in this background section, as well as aspects of the description that may not otherwise qualify as prior art at the time of filing, are neither expressly nor impliedly admitted as prior art against the present disclosure It is in this context that embodiments arise.

SUMMARY

The present embodiments relate to solving one or more problems found in the related art, and more specifically include systems and methods for testing and detecting waviness (surface/refractive index irregularity) of flat transparent optical elements and displays.

An interferometric waviness detection system is disclosed and includes a beam splitter configured to receive a collimated light signal and split the collimated light signal into a first light signal traveling along a first path and a second light signal traveling along a second path. The detection system includes a first mirror configured to receive and reflect the first light signal along the first path. The detection system includes a second mirror configured to receive and reflect the second light signal along the second path via a transparent material that is located along the second path between the beam splitter and the second mirror. The detection system includes a 2D photosensor array configured to receive from the beam splitter the reflected first light signal along the first path merged with the reflected second light signal double passing through the transparent material along the second path and generate an interference fringe pattern. A non-sinusoidal interference fringe pattern indicates geometrical phase variation between a first wavefront of the reflected first light signal along the first path and a second wavefront of the reflected second light signal double passing through the transparent material along the second path.

A method for measuring waviness (e.g., non-uniform variation) in the flatness of a transparent optical material is disclosed. The method includes receiving a collimated light signal at a beam splitter. The method includes splitting the collimated light signal using the beam splitter into a first light signal traveling along a first path and a second light signal traveling along a second path. The method includes receiving the first light signal and reflecting the first light signal along the first path using a first mirror. The method includes receiving at a second mirror the second light signal through a transparent material located along the second path between the beam splitter and the second mirror. The method includes reflecting the second light signal received from the transparent material along the second path using the second mirror. The method includes merging using the beam splitter the reflected first light signal traveling along the first path and the reflected second light signal double passing through the transparent material along the second path. The method includes generating an interference fringe pattern from the reflected first light signal merged with the reflected second light signal. A non-sinusoidal interference fringe pattern indicates geometrical phase variation between a first wavefront of the reflected first light signal traveling along the first path and a second wavefront of the reflected second light signal double passing through the transparent material along the second path.

An interferometric waviness detection system is disclosed and includes a beam splitter configured to receive a collimated light signal having a first linear polarization and split the collimated light signal into a first light signal traveling along a first path and a second light signal traveling along a second path. The detection system includes a first quarter-wave plate. The detection system includes a mirror configured to receive and reflect the first light signal along the first path via the first quarter-wave plate located along the first path between the beam splitter and the mirror. The detection system includes a display module of a device under test (DUT) configured to receive and reflect the second light signal along the second path. The detection system includes a 2D photosensor array configured to receive from the beam splitter the reflected first light signal double passing through the first quarter-wave plate along the first path merged with the reflected second light signal along the second path and generate an interference fringe pattern. A non-sinusoidal interference fringe pattern indicates geometrical phase variation between a first wavefront of the reflected first light signal along the first path and a second wavefront of the reflected second light signal along the second path received by the beam splitter.

A method for measuring waviness (e.g., non-uniform variation) in the flatness of a transparent optical material is disclosed. The method includes receiving a collimated light signal having a first linear polarization at a beam splitter. The method includes splitting the collimated light signal using the beam splitter into a first light signal traveling along a first path and a second light signal traveling along a second path. The method includes receiving at a mirror the first light signal through a first quarter-wave plate located along the first path between the beam splitter and the mirror. The method includes reflecting the first light signal received from the first quarter-wave plate along the first path using the mirror. The method includes receiving the second light signal and reflecting the second light signal along the second path using a display module of a device under test (DUT). The method includes merging using the beam splitter the reflected first light signal double passing through the first quarter-wave plate along the first path and the reflected second light signal traveling along the second path. The method includes generating an interference fringe pattern from the reflected first light signal merged with the reflected second light signal. A non-sinusoidal interference fringe pattern indicates a geometrical phase variation between a first wavefront of the reflected first light signal along the first path and a second wavefront of the reflected second light signal along the second path received by the beam splitter.

These and other advantages will be appreciated by those skilled in the art upon reading the entire specification and the claims.

BRIEF DESCRIPTION OF THE DRAWINGS

The embodiments may best be understood by reference to the following description taken in conjunction with the accompanying drawings. The drawings are not drawn to scale.

FIG. 4 is a flow diagram illustrating a method for measuring variation in flatness, or variation in thickness, or variation in refractivity of a transparent material, in accordance with one embodiment of the present disclosure.

FIG. 5B-1 is a top down view of the interferometer waviness detection system of FIG. 5A that is configured to detect flatness of a display module, in accordance with one embodiment of the present disclosure.

FIG. 5B-2 is a top down view of the interferometer waviness detection system of FIG. 5A that is configured to detect flatness of a display module, in accordance with one embodiment of the present disclosure.

FIG. 5C-1 illustrates a cutaway view of the interferometer waviness detection system of FIGS. 5A-5B taken along a line drawn between points B-B of FIG. 5B, in accordance with one embodiment of the present disclosure.

FIG. 5C-2 illustrates a cutaway view of the interferometer waviness detection system of FIGS. 5A-5B taken along a line drawn between points B-B of FIG. 5B, in accordance with one embodiment of the present disclosure.

DETAILED DESCRIPTION

Although the following detailed description contains many specific details for the purposes of illustration, anyone of ordinary skill in the art will appreciate that many variations and alterations to the following details are within the scope of the present disclosure. Accordingly, the aspects of the present disclosure described below are set forth without any loss of generality to, and without imposing limitations upon, the claims that follow this description.

Generally speaking, the various embodiments of the present disclosure describe interferometer systems that can detect the degree of flatness of a transparent optical material (e.g., cover glass) and a display module with circular polarizer, wherein the interferometer systems are based on a Michelson interferometer setup. In particular, the interferometric waviness detection system of embodiments of the present disclosure distinctively determines the quality and/or degree of physical flatness of an optically transparent material or reflective material, such as one of the layers of a display module. Embodiments of the present disclosure use light wave interference to detect phase variation coming out of the transparent optical material caused by flatness variation, thickness variation, or refractive index variation. Embodiments of the present invention use a modified Michelson interferometer setup to detect thickness and/or refractive index uniformity over a transparent optical object area and/or a reflective material of a display module.

With the above general understanding of the various embodiments, example details of the embodiments will now be described with reference to the various drawings. Similarly numbered elements and/or components in one or more figures are intended to generally have the same configuration and/or functionality. Further, figures may not be drawn to scale but are intended to illustrate and emphasize novel concepts. It will be apparent, that the present embodiments may be practiced without some or all of these specific details. In other instances, well-known process operations have not been described in detail in order not to unnecessarily obscure the present embodiments.

Figure 1:
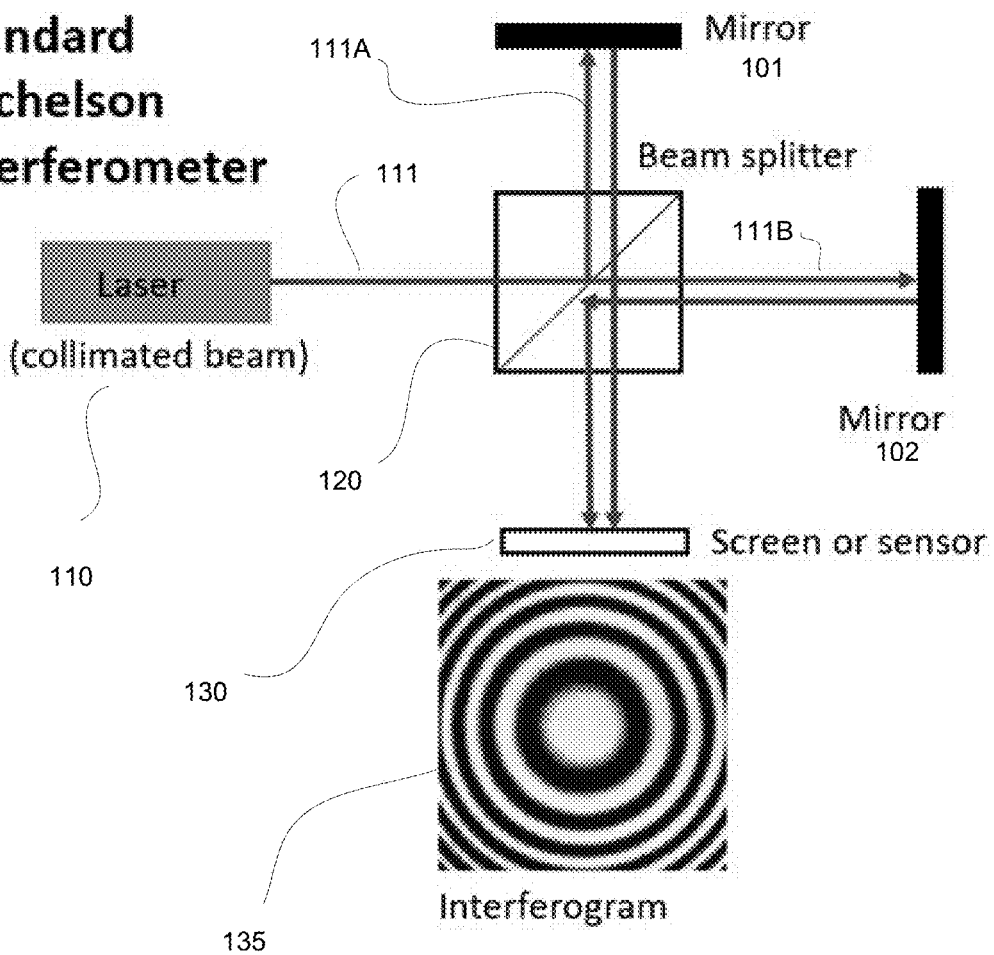
FIG. 1 illustrates a Michelson interferometer.

FIG. 1 illustrates a standard Michelson interferometer. A coherent laser 110 is collimated and aligned in such a way that after a beam splitter 120 splits the beam 111 into multiple beams, they are reflected from two separate mirrors 101 and 102. The reflected beams are later combined by the beam splitter 120 onto a plane of sensor 130. The intrinsic interferogram 135 gives an indication about wave front quality of the coherent collimated laser source 110.

In particular, the coherent laser beam 111 may be collimated by a telescopic beam expander. The laser beam 111 then passes through beam splitter 120 configured to split the beam 111 equally (50:50). One arm of the laser beam 111 will be reflected ninety degrees (90°) and be bounced off from mirror 101. This beam 111A will pass directly through the beam splitter 120 to be received by the screen or sensor 130.

The second arm of the laser beam 111 will first pass through the beam splitter 120 (e.g., without reflection) and then bounce off from mirror 102. This bounced beam 111B will then be reflected ninety degrees (90°) by the beam splitter 120.

Once mirror 101, mirror 102 and the laser 110 are aligned correctly, the beam 111A off of mirror 101 and the beam 111B off of mirror 102 will interfere with each other, and generate an interferogram (interference fringe pattern) 135. In an ideal setup, a uniform interference fringe pattern is formed as there is no interference along either path.

Embodiments of the present invention provide for interferometric waviness detection systems and methods for implementing the same that each modify the Michelson interferometer setup to accommodate for different optical module waviness detections and inspections. and method for implementing the same.

Figure 2A:
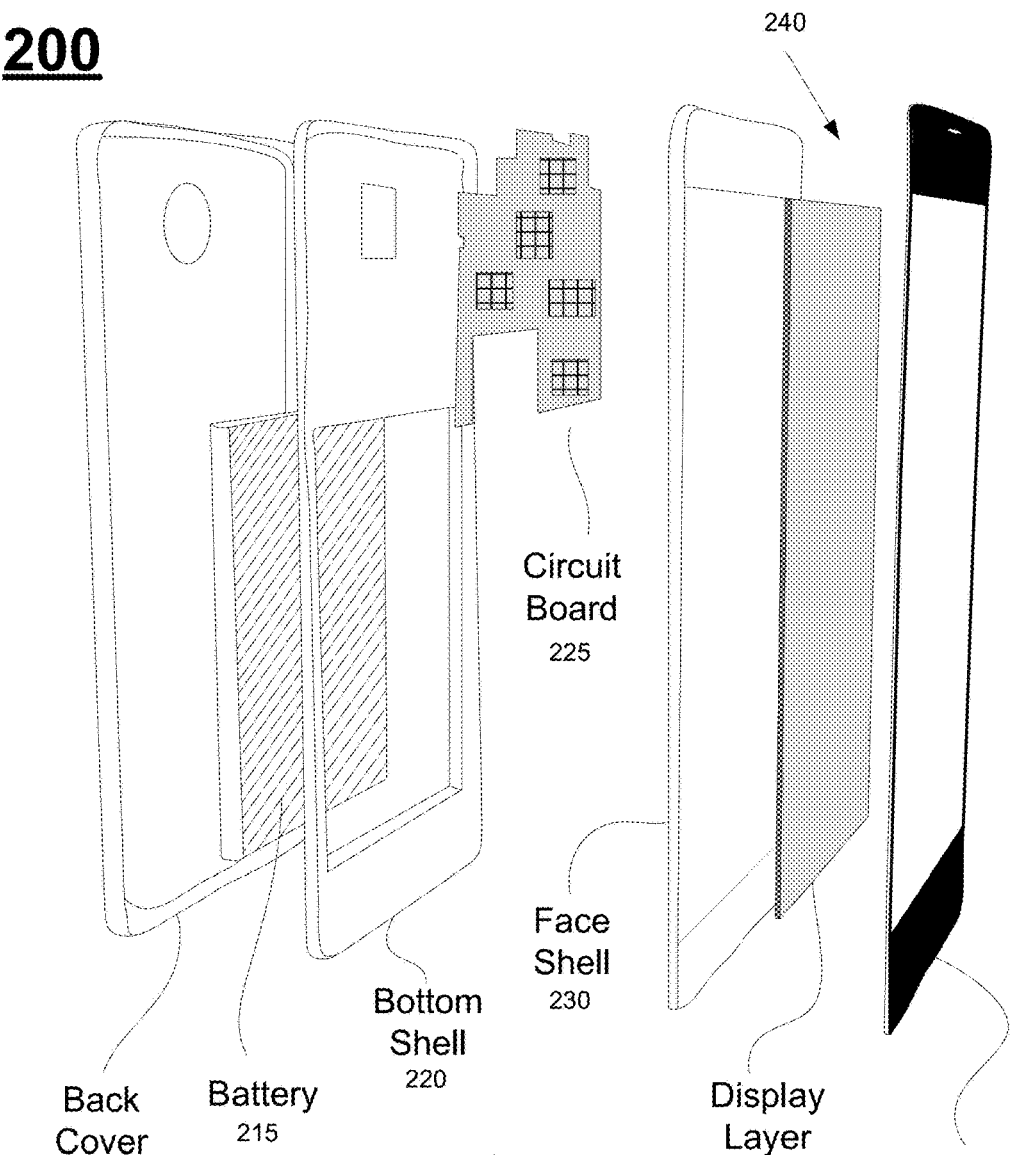
FIG. 2A illustrates various component layers of a mobile phone, including a display module having a transparent cover glass and display layer, the flatness of each being measured using embodiments of the present disclosure.

FIG. 2A illustrates various exemplary component layers of a mobile phone 200, including a display module 240 having a display layer 270 and a transparent optical material 250 (e.g., cover glass/touch panel 250a), the flatness of each being measured using embodiments of the present disclosure. The mobile phone is provided purely as an illustration of the use of a display module 240 and/or transparent optical material 250, the flatness of each being measurable through embodiments of the present disclosure. Not all components of the mobile phone are illustrated. Other uses of the display module 240 and/or transparent optical material 250 are supported, whose flatness is measurable through embodiments of the present disclosure. For example, the display module 240 and/or transparent optical material 250 may be found in mobile devices with display screens, television screens, computer monitors, tablet devices, integrated display screens (e.g., integrated into dash of vehicle, desk surface, panel, etc.), portable communication devices, etc.

As shown, the mobile phone 200 includes a back cover 210. A bottom shell 220 is interfaced with a face shell 230 to protect the circuit board 225 that is configured to provide functionality to the mobile phone 200. The bottom shell 220 is configured to support a battery 215, and is further configured to interface with the back cover 210. The face shell 230 is configured to interface with and support a display module 240. When fully assembled, the display module 240 includes a display layer 270 and cover glass/touch panel 250a. The cover glass/touch panel 250a is configured as a transparent material or transparent optical material 250. When interfacing together all of the various components, the mobile phone 200 is configured in a convenient package suitable for handling by human hands.

Figure 2B:
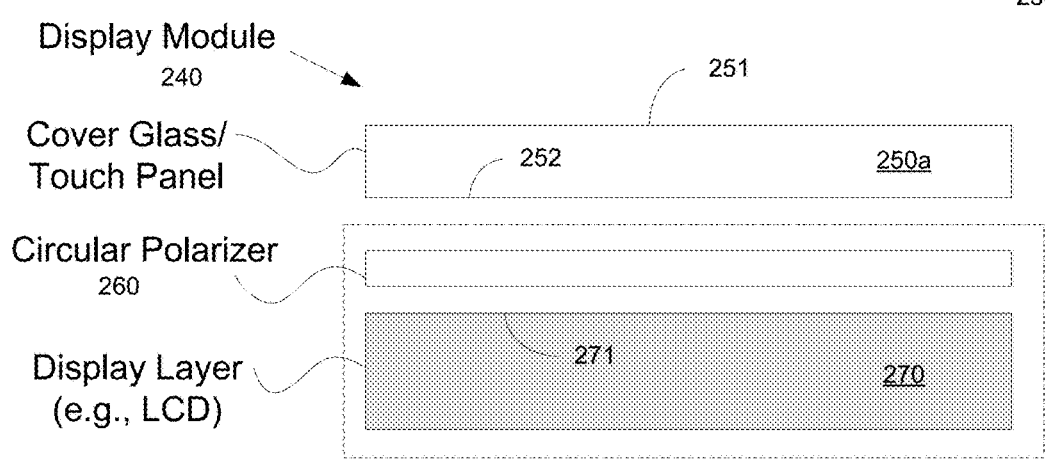
FIG. 2B is a cross section of a display module having various layers, the flatness of which can be measured using embodiments of the present disclosure.

FIG. 2B is a cross section of the display module 240 having various layers, the flatness of each being measured using embodiments of the present disclosure. When fully assembled, the display module 240 includes a display layer 270, such as a liquid crystal display (LCD), a circular polarizer 260, and optically transparent cover glass/touch panel 250a. In some configurations, the circular polarizer 260 may be integrated within the display layer 270 as is shown by the dotted outline surrounding both the display layer 270 and circular polarizer 260. The display layer 270 is configured to provide a visual interface with a corresponding user, such as by displaying images that are viewable by the user. The display layer 270 may include one or more additional layers, though not herein described in full. Various technologies are used to build the display layer 270 typically configured as pixels providing colored light that are viewable by a user. These technologies include liquid-crystal displays (LCDs), light-emitting diodes (LEDs), organic light-emitting diodes (OLED), etc. The cover glass/touch panel 250a is located adjacent to the display layer 270 or the circular polarizer 260 that is associated with the display layer 270. Cover glass/touch panel 250a is configured as a user interface, wherein the user may interact with the mobile phone 200 and/or provide input control through touching the glass or panel 250a using a stylus or one or more fingers.

When one or more layers of the display module 240, including the display layer 270 and/or the cover glass/touch panel 250a, are defective, the visual interfacing with the user suffers. For example, distorted images may be presented to the user that are caused by defects in the display layer 270 and/or the cover glass/touch panel 250a. Slight distortions may degrade the user's viewing experience. Extreme distortion may introduce motion sickness for the user. As such, the layers of the display module 240, such as the display layer 270 and/or the cover glass/touch panel 250a, should be uniform, or flat, in order to provide the best viewing experience to the user.

In particular, uniform flatness of the top surface 251 of the cover glass/touch panel 250a and top surface 271 of display layer 270 is desired for optimum viewing experience of the user. Embodiments of the present disclosure are configured to detect and/or measure the flatness of the top surface 251 of cover glass 250a or other transparent material, and of the top surface 271 of display layer 270 or other reflective material. These embodiments are also capable of detecting and/or measuring the variation in thickness of the cover glass/touch panel 250a or other transparent material 250 and/or the variation in the refractive index (or refractivity) across the cover glass/touch panel 250a or other transparent material 250. For example, embodiments of the present disclosure are configured to detect and/or measure the variation in thickness between the top surface 251 and bottom surface 252 of cover glass 250a or other transparent material. Also, embodiments of the present disclosure are configured to detect and/or measure the variation in refractivity (e.g., index of refraction) between the top surface 251 and bottom surface 252 of the cover glass 250a, or other transparent material.

Figure 3A:
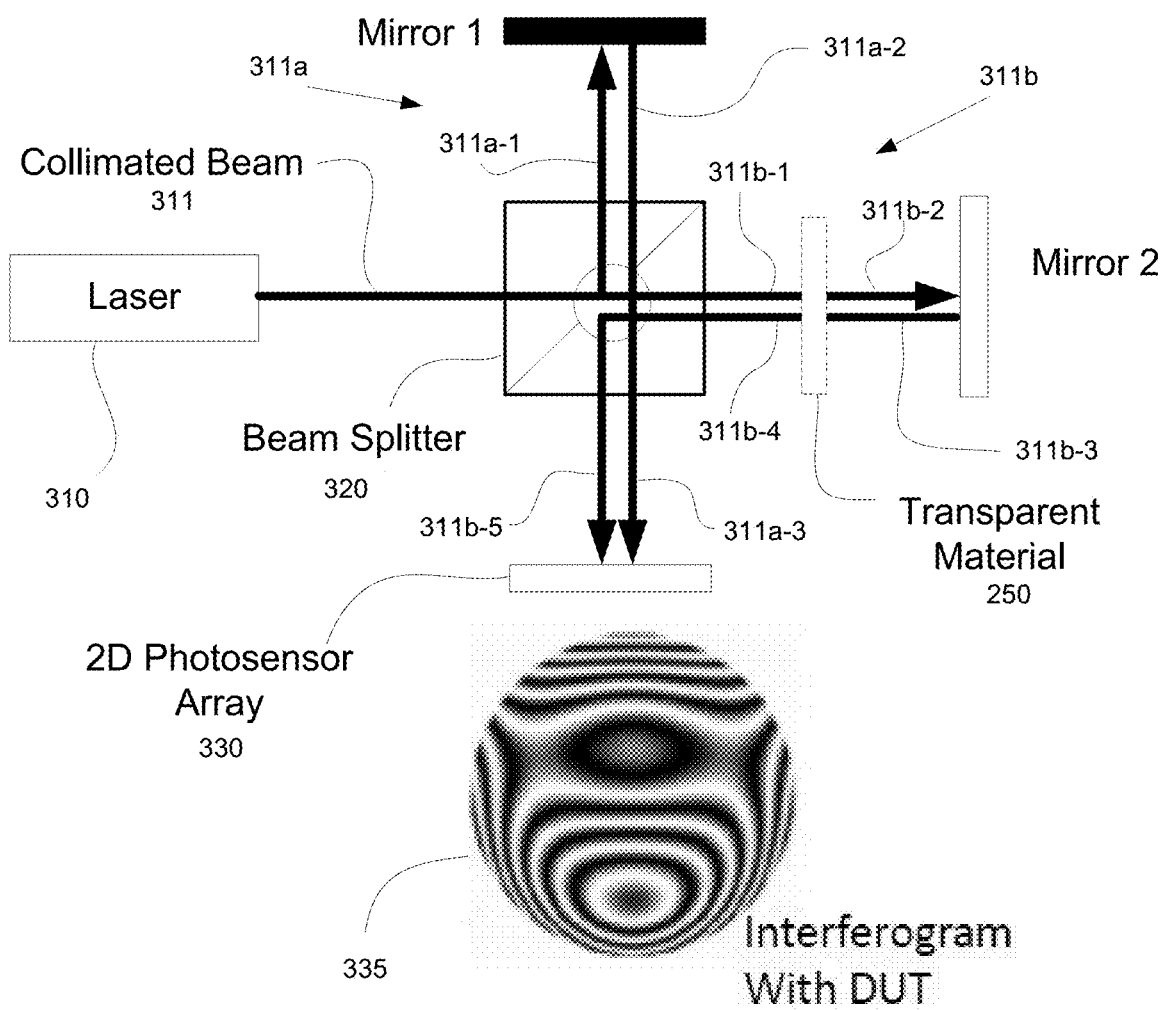
FIG. 3A is a block diagram of an interferometer waviness detection system configured to detect flatness of a transparent optical material, in accordance with one embodiment of the present disclosure.

FIG. 3A is a block diagram of an interferometer waviness detection system 300A configured to detect variation in flatness, variation in thickness, and/or variation of refractivity of a transparent optical material (e.g., cover glass/touch panel, display cover glass, thin film, optical thin film material, etc.), in accordance with one embodiment of the present disclosure. The interferometer waviness detection system 300A uses light wave interference to detect phase variation between a reference signal and a signal coming out of a transparent optical material. The phase variation is caused by a variation in flatness, a variation in thickness, and/or a variation in the refractive index of the transparent optical material. As such, any waviness (e.g., non-uniformity or variation in flatness, thickness, and/or refractivity) in the transparent material is capable of being detected and analyzed with interferometer waviness detection system 300A.

The interferometer waviness detection system 300A includes a laser 310 that is configured to output a light signal. In one embodiment, the laser 310 outputs a coherent light signal, which emits continuous light waves of the same wavelength. The coherent light signal may be collimated when output from laser 310, or may be collimated using a collimator device. A beam splitter 320 is configured to receive the collimated light signal 311, and is further configured to split the collimated light signal 311 into a first light signal 311a traveling along a first path (e.g., along a first arm) and a second light signal 311b traveling along a second path (e.g., along a second arm). In one embodiment, the beam splitter 320 is configured as a fifty/fifty beam splitter which effectively splits the collimated light signal 311 evenly for purposes of generating interference fringe patterns and their analysis. In one embodiment, the first light signal is identical (e.g., same frequency and phase) to the second light signal, as output from the beam splitter 320.

The interferometer waviness detection system 300A includes mirror 1, which is configured to receive and reflect the first light signal along the first path. The first light signal traveling along the first path may provide a reference signal. As an illustration, the first path may be broken into segments, as follows. In particular, the first light signal 311a is reflected off the beam splitter 320 along the first segment 311a-1 of the first path. The first light signal 311a is reflected off mirror 1 and travels along the second segment 311a-2 of the first path. The first light signal 311a that is reflected off mirror 1 is transmitted or passed through the beam splitter 320 and travels along the third segment 311a-3 of the first path. A 2D photosensor array 330 is configured to receive the first light signal 311a that is reflected off mirror 1 and passed through the beam splitter 320. The 2D photosensor array 330 is configured to sense or detect light signals using one or more sensing technologies.

The interferometer waviness detection system 300A includes mirror 2, which is configured to receive and reflect the second light signal 311b along the second path via a transparent material 250. In particular, the transparent material 250 is located along the second path between the beam splitter 320 and mirror 2. As an illustration, the second path may be broken into segments, as follows. The second light signal 311b is transmitted or passed through the beam splitter 320 and travels along the first segment 311b-1 of the second path. The second light signal 311b is transmitted or passed through the transparent material 250 (e.g., transparent optical material, cover glass, touch screen, etc.) and then travels along the second segment 311b-2 of the second path. As shown, the transparent material 250 is located along the second path between the beam splitter 320 and mirror 2. The second light signal 311b is reflected off mirror 2 and travels along the third segment 311b-3 of the second path. The second light signal 311b is transmitted or passed through the transparent material 250 and then travels along the fourth segment 311b-4 of the second path. The second light signal 311b is then reflected off the beam splitter 320 and then travels along the fifth segment 311b-5 of the second path. The 2D photosensor array 330 is configured to receive the second light signal 311b, wherein the second light signal 311b is reflected off mirror 1, double passed through the transparent material 250, and reflected off the beam splitter 320.

As such, the 2D photosensor array 330 (e.g., sensor plane) is configured to receive from the beam splitter the reflected first light signal along the first path merged with the reflected second light signal double passing through the transparent material along the second path and generate an interference fringe pattern. The reflected second light signal 311b may have a shift in phase (though having the same frequency) when compared to the reflected first light signal 311a, wherein the shift in phase may be caused by a geometrical variation (e.g., non-uniformity) in flatness, thickness, or refractivity (index of refraction) in the transparent material 250. For example, the wavefront (i.e., second wavefront) of the second light signal 311b may be different than a wavefront (i.e., first wavefront) of the first light signal 311a when reaching the beam splitter 320.

The interference fringe pattern or interferogram 335 provides an indication on whether there is a change in phase between the wavefronts of the first light signal 311a (e.g., reflected off mirror 1) and the second light signal 311b (double passing through the transparent material 250, reflected off mirror 2, and reflected off the beam splitter 320) as received by the 2D photosensor array 330. That is, a phase variation between the wavefront of the first light signal 311a and the wavefront of the second light signal 311b as received by the 2D photosensor array 330 induces a disturbance in the resulting interferogram 335. In particular, a non-sinusoidal interference pattern indicates geometrical phase variation between a wavefront of the reflected first light signal along the first path and a wavefront of the reflected second light signal double passing through the transparent material along the second path. That is, a non-uniform interference fringe pattern indicates a change in phase, which correlates to a variation in the flatness, or variation in thickness, or variation in refractivity of the transparent material 250. In addition, a sinusoidal interference pattern indicates no abnormal change in phase between the wavefront of the reflected first light signal along the first path and the wavefront of the reflected second light signal double passing through the transparent material along the second path. That is, a uniform interference fringe pattern indicates no change in phase due to material non-uniformity, which correlates to no abnormal variation in the flatness, or thickness, or refractivity of the transparent material 250. The information extracted from the interferogram 335 gives an indication as to the amount of variation in the flatness (e.g., degree of flatness), or thickness (degree of thickness), or refractivity of the transparent material 250. For example, sinusoidal interference patterns represent that there is phase change between the two paths, and if the pattern is uniform that is a normal change in phase between the wavefront of the reflected first light signal along the first path and the wavefront of the reflected second light signal double passing through the transparent material along the second path. On the other hand, if the pattern is not uniform, this indicates abnormal change in phase due to material or geometric non-uniformity of the device.

Figure 3B:
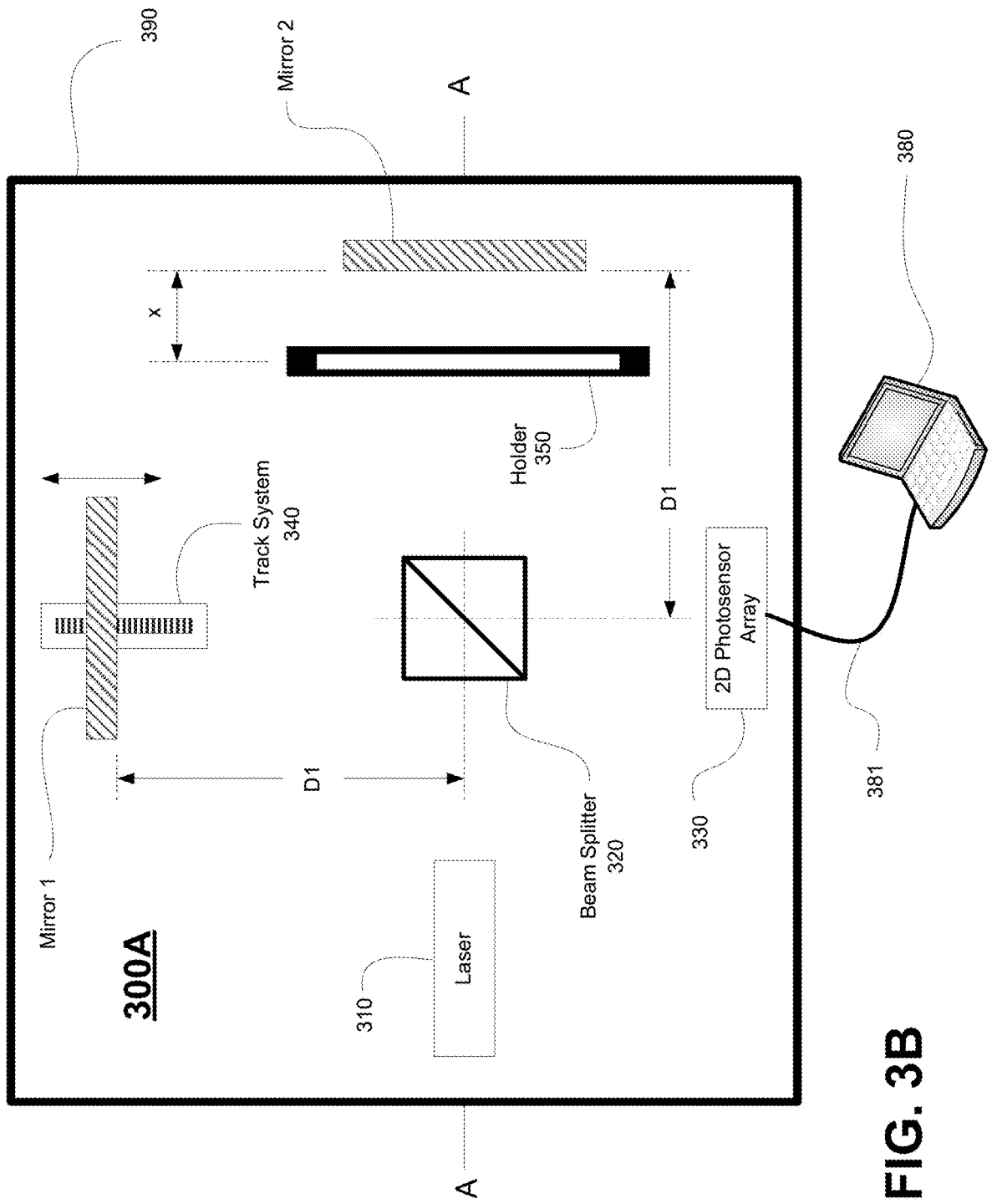
FIG. 3B is a top down view of the interferometer waviness detection system of FIG. 3A that is configured to detect flatness of a transparent optical material, in accordance with one embodiment of the present disclosure.

FIG. 3B is a top down view of the interferometer waviness detection system 300A of FIG. 3A that is configured to detect variation in flatness, or thickness, or refractivity of a transparent optical material, in accordance with one embodiment of the present disclosure. The interferometer waviness detection system 300A as shown in FIGS. 3A-3B provides one configuration for detecting the variation in the flatness (e.g., degree of flatness), or thickness (degree of thickness), or refractivity of the transparent material 250. Other configurations are supported. For example, the transparent material may be located between the beam splitter 320 and mirror 1 (e.g., along the first path) instead of being located along the second path. Consistent between any configuration of the interferometer waviness detection system 300A is that the physical distances between the beam splitter 320 and the mirror 1 or mirror 2 are identical (e.g., distance D1).

As shown in FIG. 3B, the components of the interferometer waviness detection system 300A is located within support structure 390. For example, the support structure 390 may be a physical housing, or a surface. Mirror 1 may be located on a track system 340 so that the location of mirror 1 with respect to the beam splitter 320 may be adjusted (e.g., fine-tuned). Track system 340 may also provide for adjusting the orientation of mirror 1 with respect to the beam splitter. In particular, mirror 1 is located a distance D1 from the beam splitter, wherein the distance D1 is measured from the point of the beam splitter where the collimated light signal 311 originating from laser 310 is reflected (along the first path) or transmitted (along the second path), such as a center point of the beam splitter 320.

In addition, mirror 2 is located the same distance D1 from the beam splitter. Though mirror 2 is shown as being fixed within outline 390, mirror 2 may be on its own track system that provides for movement and/or orientation alignment of mirror 2 with respect to the beam splitter 320. As previously introduced, the distance D1 along the second path is measured from the point of the beam splitter where the collimated light signal 311 originating from laser 310 is reflected (along the first path) or transmitted (along the second path), such as a center point of the beam splitter 320. When aligned, both mirror 1 and mirror 2 are each separated from the beam splitter 320 by distance D1. That is, a first distance between the first mirror and the beam splitter along the first path (e.g., as traveled by the first light signal) is approximately equal to a second distance between the second mirror and the beam splitter along the second path (e.g., as traveled by the second light signal). For example, the distance D1 may be approximately 1 foot, or may be greater than 1 foot, or less than 1 foot. Because the distances D1 between mirror 1 and mirror 2 and the beam splitter are nearly identical, no change in phase would be detected between the first light signal 311a and the second light signal as received by the 2D photosensor array 330 when no transparent material or phase perturbation is placed within the interferometer waviness detection system 300A, such as along the second path (or first path).

Holder 350 is located along the second path, and more particularly located between the beam splitter 320 and mirror 2. Holder 350 is configured for holding, supporting, and/or clasping onto the transparent material 250, such that the transparent material 250 is fixed in space with respect to the beam splitter 320 and mirror 2. As shown, holder 350 is located a distance x from mirror 2. The holder 350 may located anywhere along a line stretching between the beam splitter 320 and mirror 2 (e.g., along the second path). That is, the transparent material may be located anywhere between the beam splitter 320 and mirror 2 along the second path. The detection of the variation in the flatness, or variation in thickness, or variation in refractivity of the transparent material 250 will be similar no matter the location of the transparent material 250 between the beam splitter 320 and mirror 2.

Holder 350 may be attached to the support structure 390. Although holder 350 is shown fixed within the support structure 390, holder 350 may also be located on a track system that provides for movement and/or orientation alignment of the transparent material 250.

2D photosensor array 330 is configured to receive from the beam splitter 320 the reflected first light signal 311a along the first path merged with the reflected second light signal 311b, passing through the transparent material again along the second path, and generate an interference fringe pattern or interferogram 335. A computing device 380 may be coupled to the 2D photosensor array 330 in order to display, store, and/or analyze the interference fringe pattern 335. For example, computing device 380 may be coupled via a wired connection 381, or a wireless connection.

Figure 3C:
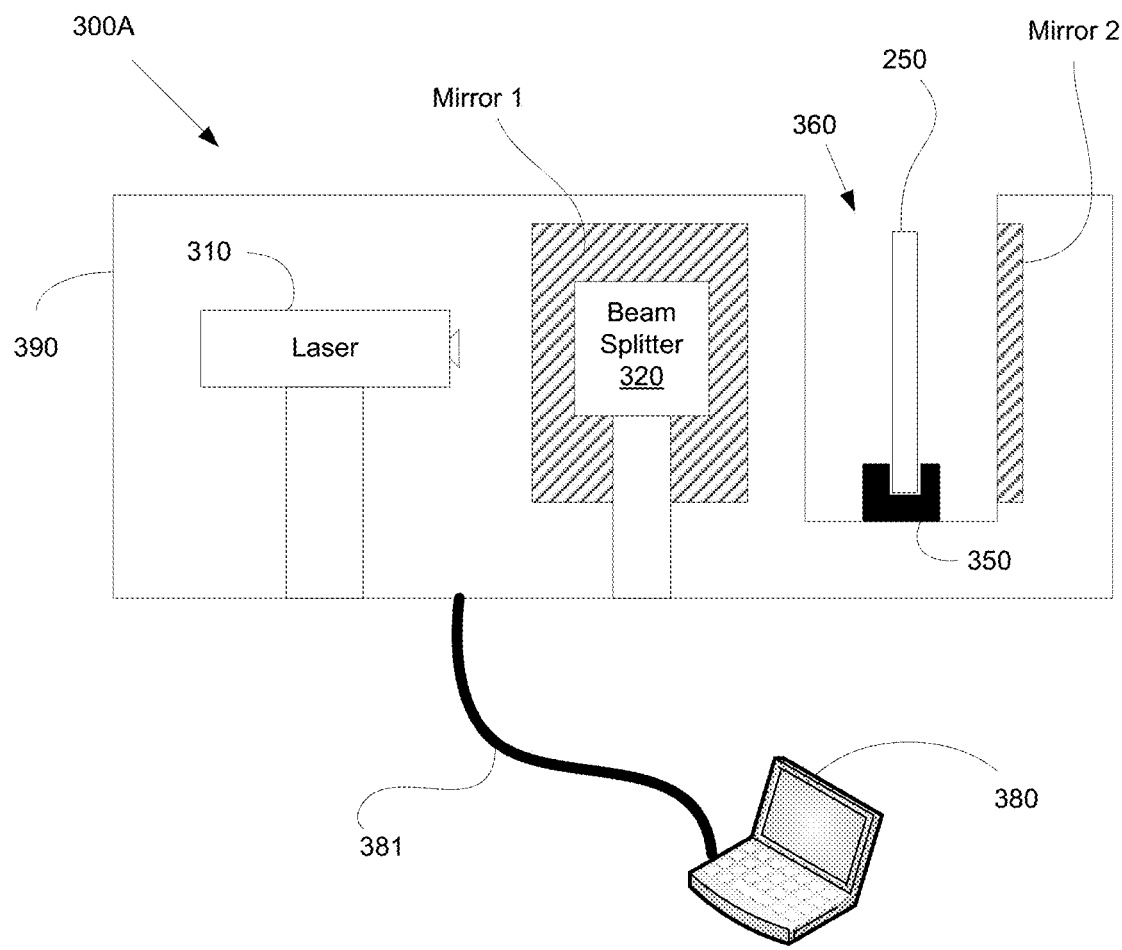
FIG. 3C illustrates a cutaway view of the interferometer waviness detection system of FIGS. 3A-3B taken along a line drawn between points A-A in FIG. 3B, in accordance with one embodiment of the present disclosure.

FIG. 3C illustrates a cutaway view of the interferometer waviness detection system 300A of FIGS. 3A-3B taken along a line drawn between points A-A in FIG. 3B, in accordance with one embodiment of the present disclosure. As shown in FIG. 3C, the interferometer waviness detection system 300A may be enclosed and/or supported in support structure 390, as previously introduced. In particular, a collimated light signal originating from light source 310 (e.g., laser) is provided to the beam splitter 320, which splits the collimated light signal into a first light signal and a second light signal. The first light signal travels along a first path to be reflected off mirror 1 before returning back to the beam splitter 320. The second light signal travels along a second path to pass through transparent material 250, reflect off mirror 2, and then pass through the transparent material 250 again before returning back to the beam splitter 320. A 2D photosensor array is configured to receive from the beam splitter 320 the reflected first light signal merged with the reflected second light signal double passing through the transparent material and generate an interference pattern. Computing device 380 may be coupled to the 2D photosensor array 330 (e.g., wired or wireless connection, etc.) in order to display, store, and/or analyze the interference fringe pattern.

Figure 3D:
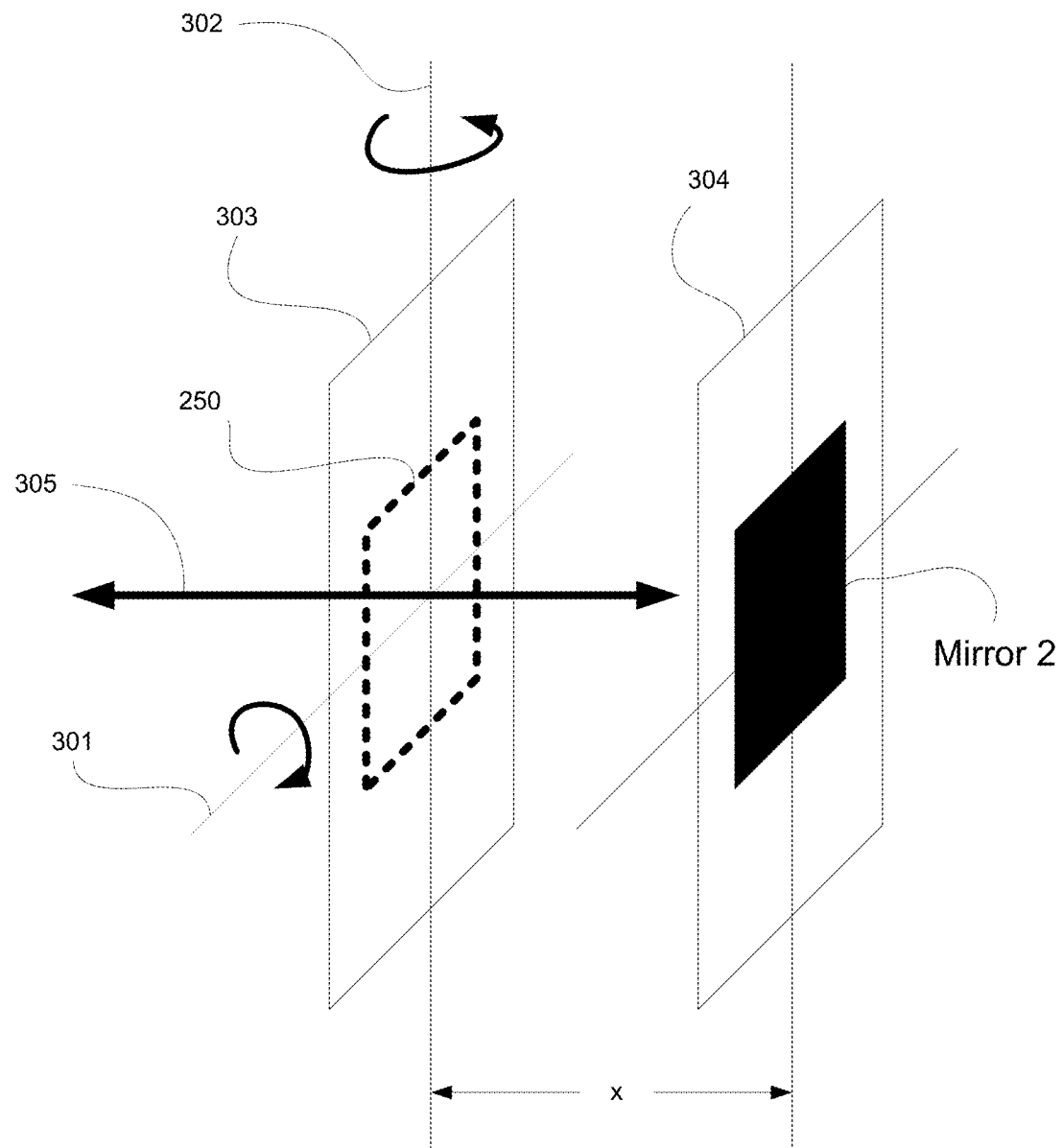
FIG. 3D illustrates the placement of a transparent optical material in the interferometer waviness detection system of FIGS. 3A-3C, and the different orientations of the transparent optical material within the detection system that still provide accurate detection of the flatness, in accordance with one embodiment of the present disclosure.

FIG. 3D illustrates the placement of a transparent optical material in the interferometer waviness detection system 300A of FIGS. 3A-3C, and the different orientations of the transparent optical material within the detection system that still provide accurate detection of a variation in flatness, or thickness, or refractivity in the transparent material 250, in accordance with one embodiment of the present disclosure.

An advantage of the interferometer waviness detection system 300A is that the transparent material 250 can be located anywhere between the beam splitter 320 and mirror 2. As shown in FIG. 3D, distance "x" may range between 0 to D1, to include 0 and D1 (e.g., $0 \leq x \leq D1$). That is, transparent material 250 may be located anywhere on axis 305 between the beam splitter 320 and mirror 2.

Another advantage of the interferometer waviness detection system 300A is that the orientation of transparent material 250 need not be perfectly aligned with mirror 2 in order to detect a variation in flatness, or thickness, or refractivity of the transparent material 250. That is, transparent material 250 need not be perfectly parallel with mirror 2. For example, plane 303 of the transparent material 250 may be non-parallel to the plane 304 of mirror 2 within the interferometer waviness detection system 300A. For example, transparent material 250 may be rotated on one or more of axis 302 and axis 301. Purely as an example, transparent material 250 may be rotated by up to 5 degrees about each of axis 302 and axis 301 from a perfectly aligned orientation, such that the interferometer waviness detection system 300A is still able to detect a variation in flatness, or thickness, or refractivity of the transparent material 250. Purely as another example, transparent material 250 may be rotated by up to 10 degrees about each of axis 302 and axis 301 from a perfectly aligned orientation, such that the interferometer waviness detection system 300A is still able to detect a variation in flatness, or thickness, or refractivity of the transparent material 250. Purely as another example, transparent material 250 may be rotated by up to 15 degrees about each of axis 302 and axis 301 from a perfectly aligned orientation, such that the interferometer waviness detection system 300A is still able to detect a variation in flatness, or thickness, or refractivity of the transparent material 250. Purely as another example, transparent material 250 may be rotated by up to 30 degrees about each of axis 302 and axis 301 from a perfectly aligned orientation, such that the interferometer waviness detection system 300A is still able to detect a variation in flatness, or thickness, or refractivity of the transparent material 250. Of course, in other embodiments, plane 303 of the transparent material 250 may be parallel to the plane 304 of mirror 2 within the interferometer waviness detection system 300A.

FIG. 4 is a flow diagram 400 illustrating a method for measuring variation in flatness, or variation in thickness, or variation in refractivity of a transparent material, in accordance with one embodiment of the present disclosure. Flow diagram 400 may be implemented by the interferometer waviness detection system 300A of FIGS. 3A-3D, in embodiments to detect any waviness (e.g., non-uniformity and/or variation in flatness, thickness, and/or refractivity) of a transparent material (e.g., transparent optical material, cover glass/touch pane or panel, display cover glass, thin film, optical thin film material, etc.).

At 410, the method includes receiving a collimated light signal at a beam splitter. The collimated light signal may originate from a light source, such as a laser providing a coherent beam of light, which is then collimated. The collimated light signal is received by the beam splitter, which then splits the collimated light signal at 420 into a first light signal and a second light signal. For example, the first light signal and the second light signal are identical, in one embodiment. The first light signal travels along a first path, and the second light signal travels along a second path.

At 430, the method includes receiving the first light signal and reflecting the first light signal along the first path using a first mirror. The first light signal may be configured as a reference signal.

At 440, the method includes receiving at a second mirror the second light signal along the second path. The second light signal is received at the second mirror after passing through a transparent material that is located along the second path between the beam splitter and the second mirror. At 450, the method includes reflecting the second light signal along the second path using the second mirror, wherein the second light signal is received after passing through the transparent material. After reflection, the second light signal again passes through (e.g., a double pass) the transparent material.

At 460, the method includes merging using the beam splitter the reflected first light signal traveling along the first path and the reflected second light signal double passing through the transparent material along the second path. That is, the reflected first light signal and the reflected second light signal are combined. At 470, the method includes generating an interference pattern (e.g., interference fringe pattern) from the reflected first light signal merged with the reflected second light signal. For example, a 2D photosensor array is configured to receive the reflected first light signal merged with the reflected second light signal and sense and/or detect the merged light signals, such that the interference pattern may be generated. The interference pattern may be an interference fringe pattern or interferogram.

In particular, the interference pattern may show any change in phase between the reflected first light signal traveling along the first path and the reflected second light signal double passing through the transparent material along the second path. Any phase variation between the reflected first light signal the reflected second light signal double passing through the transparent material induces a disturbance in the interference pattern. In particular, a non-sinusoidal or non-uniform interference pattern indicates geometrical phase variation between a wavefront of the reflected first light signal and a wavefront of the reflected second light signal received at the beam splitter. The change in phase is caused by one or more of a variation in flatness, variation in thickness, and a variation in refractivity of the transparent material. Also, a sinusoidal or uniform interference pattern indicates no abnormal variation in phase between the reflected first light signal and the reflected second light signal received at the beam splitter. That is, no abnormal variation in phase indicates that there is uniform flatness, or uniform thickness, or uniform refractivity of the transparent material.

Figure 5A:
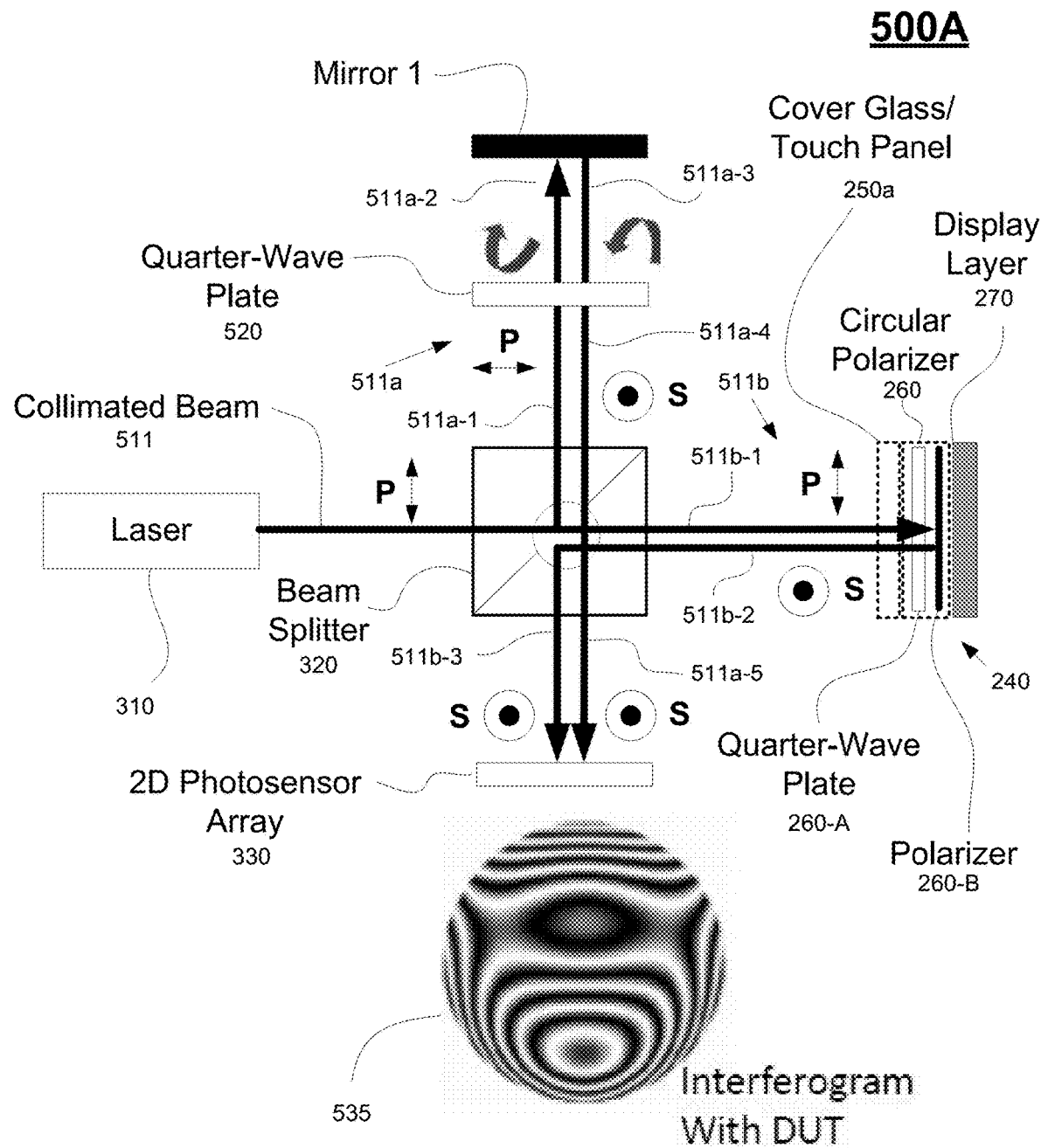
FIG. 5A is a block diagram of an interferometer waviness detection system configured to detect flatness of a display module that acts as a reflecting mirror, in accordance with one embodiment of the present disclosure.

FIG. 5A is a block diagram of an interferometer waviness detection system 500A configured to detect flatness of a display module that acts as a reflecting mirror, in accordance with one embodiment of the present disclosure. The interferometer waviness detection system 500A modifies a Michelson interferometer setup to detect and/or measure variation in flatness of a display module. In particular, the modified Michelson interferometer setup performing waviness detection includes an assembled display module as one of the reflecting elements. That is, a reflective optical object (such as an assembled display module with circular polarizer 260, which consists of a quarter-wave plate 260-A and a polarizer 260-B) functions as a light reflecting mirror in the interferometer waviness detection system 500A. The interferometer waviness detection system 500A uses light wave interference to detect phase variation between a reference signal and a signal reflected off the assembled display module. The phase variation is caused by a variation in flatness of the assembled display module. As such, any waviness (e.g., non-uniform flatness) in the assembled display module is capable of being detected and analyzed with the interferometer waviness detection system 500A. In particular, a resulting interferogram 535 gives an indication as to the quality of the reflective optical object, such as display module 240.

The interferometer waviness detection system 500A includes laser 310 that is configured as a light source that outputs a light signal. In one embodiment, the laser 310 outputs a coherent light signal, which emits continuous light waves of the same wavelength. The coherent light signal may be collimated when output from laser 310, or may be collimated using a collimator device. In one embodiment, the collimated light signal 511 is configured as a linearly polarized electromagnetic wave. For instance, the collimated light signal 511 may be transmitted through a linear polarizer, or may be output as being linearly polarized from the light source, such the electric field oscillated in a vertical or horizontal direction, or any other direction perpendicular to the direction of propagation of the collimated light signal 511. For example, in one implementation the collimated light signal 511 may be linearly polarized with linear P-polarization as received by the beam splitter 320. In another implementation, the collimated light signal 511 may be linearly polarized with linear S-polarization as received by the beam splitter 320.

Beam splitter 320 is configured to split the received collimated light signal 511 into a first light signal 511*a* traveling along a first path (e.g., along a first arm) and a second light signal 511*b* traveling along a second path (e.g., along a second arm). In one embodiment, the beam splitter 320 is configured as a fifty/fifty beam splitter which effectively splits the collimated light signal 511 evenly for purposes of generating interference fringe patterns and their analysis. In another embodiment, the first light signal 511a is identical (e.g., same frequency and phase) to the second light signal 511b, as output from the beam splitter 320. In one embodiment, the beam splitter 320 comprises a non-polarizing beam splitter.

The interferometer waviness detection system 500A includes a mirror, such as mirror 1, which is configured to receive via a quarter-wave plate 520 the first light signal 511a, and reflect the first light signal along the first path. The first light signal 511a traveling along the first path may provide a reference signal. As an illustration, the first path may be broken into segments, as follows. In particular, the first light signal 511a is reflected off the beam splitter 320 along the first segment 511a-1 of the first path. In the first segment 511a-1 of the first path, the first light signal 511a is linearly polarized with linear P-polarization (e.g., a first linear polarization), as is shown in FIG. 5A. The first light signal 511a travels from the beam splitter 320 and passes through the quarter-wave plate 520 before reaching the mirror 1 along the second segment 511a-2. The quarter-wave plate 520 is located along the first path between the beam splitter 320 and mirror 1. The quarter-wave plate 520 is configured to convert linearly polarized light to circularly polarized light, and vice versa. In the second segment 511a-2 of the first path, the first light signal 511a is now circularly polarized in a clockwise direction, in one implementation, and as is shown in FIG. 5A. In another implementation, the first light signal 511a may be circularly polarized in a counter-clockwise direction. Mirror 1 is configured to receive (after passing through the quarter-wave plate 520) and reflect the first light signal 511a in the third segment 511a-3. Mirror 1 reverses the circular polarization of the first light signal 511a. As such, in the third segment 511a-3 of the first path, the first light signal 511a is now circularly polarized in a counter-clockwise direction. In the fourth segment 511a-4 of the first path, the first light signal 511a passes again through the quarter-wave plate 520 which is configured to convert the light back to a linear polarization, but now is rotated by ninety degrees from the linear polarization of the first segment 511a-1. That is, in the fourth segment 511a-4 of the first path, the first light signal 511a is now linearly polarized with linear S-polarization (e.g., a second linear polarization). As such, the first light signal 511a double passes through the quarter-wave plate 520 and undergoes a rotation by ninety degrees (e.g., to a second linear polarization). In the fifth segment 511a-5 of the first path, the first light signal 511a passes through the beam splitter 320 and is received by the 2D photosensor array 330 (e.g., sensor plane), wherein the first light signal 511a is linearly polarized with linear S-polarization. The 2D photosensor array 330 is configured to sense or detect light signals using one or more sensing technologies.

The interferometric waviness detection system 500A includes a reflective optical object that functions as a mirror in a modified Michelson interferometer setup. In particular, the interferometric waviness detection system 500A includes the assembled display module 240 configured to display images, which includes a display layer 270 (configured to display pixel images) (e.g., LCD display, LED display, OLED display, etc.), circular polarizer 260 (which consists of a quarter-wave plate 260-A and a polarizer 260-B), and cover glass/touch panel 250a, as previously introduced. The assembled display module 240 may be a device under test (DUT). The polarizer 260-B of the circular polarizer 260 acts as a mirror, or reflector, and is configured to receive and reflect the second light signal 511b along the second path. As an illustration, the second path may be broken into segments, as follows. The second light signal 511b is transmitted or passed through the beam splitter 320, and travels along the first segment 511b-1 of the second path. In the first segment 511b-1 of the second path, the second light signal 511b is still linearly polarized with linear P polarization, as is shown in FIG. 5A. The second light signal 511b passes through the cover glass/touch panel 250a. It is assumed that the cover glass/touch panel 250a has been previously tested (e.g., using interferometer waviness detection system 300A of FIG. 3A) and has been tested to have no waviness characteristics (e.g., no variation in flatness, or thickness, or refractivity) (according to specifications), and as such there is no abnormal change in phase when the light signal passes through the cover glass/touch panel 250a. The second light signal 511b then passes through circular polarizer 260, which includes a quarter-wave plate 260-A configured to convert linearly polarized light to circularly polarized light (e.g., clockwise or counter-clockwise direction that is consistent with the operations of the quarter-wave plate 520 in the first arm), and vice versa. The circular polarizer 260 includes a polarizer 260-B that is configured to receive and reflect a significant portion (e.g., most if not all) of the second light signal 511b along the second path. Upon reflection, polarizer 260-B reverses the circular polarization of the second light signal 511b. The second light signal 511b now passes again (e.g., double passes) through the quarter-wave plate 260-A, which is configured to convert the light back to a linear polarization, but now is rotated by ninety degrees from the linear polarization present in the first segment 511b-1. As such, in the second segment 511b-2 of the second path, the second light signal 511b is now linearly polarized with linear S-polarization (e.g., a second linear polarization).

In the third segment 511b-3 of the second light signal, the 2D photosensor array 330 (e.g., sensor plane) is configured to receive from the beam splitter 320 the reflected first light signal 511a double passed through the quarter-wave plate 520 along the first path merged with the reflected second light signal 511b along the second path. As shown, the reflected first light signal 511a and the reflected second light signal 511b have the same polarizations (e.g., linear S polarization if the collimated light signal has a linear P polarization, or linear P polarization if the collimated light signal 511 starts with a linear S polarization). This is because in the first path, the first light signal 511a double passes through the quarter-wave plate 520 with a reflection from mirror 1, and in the second path, the second light signal 511b double passes through the quarter-wave plate 260-A in circular polarizer 260 of display module 240 with a reflection off of the polarizer 260-B. In either path, the polarization switching (e.g., from linear P polarization to linear S polarization) allows wavefronts of the first light signal 511a reflected from mirror and the second light signal 511b reflected off the display module 240 to be combined at sensor plane with same state of polarization, thus generating interferogram or interference fringe pattern giving flatness information of the display module 240.

Figures 1, 5B:
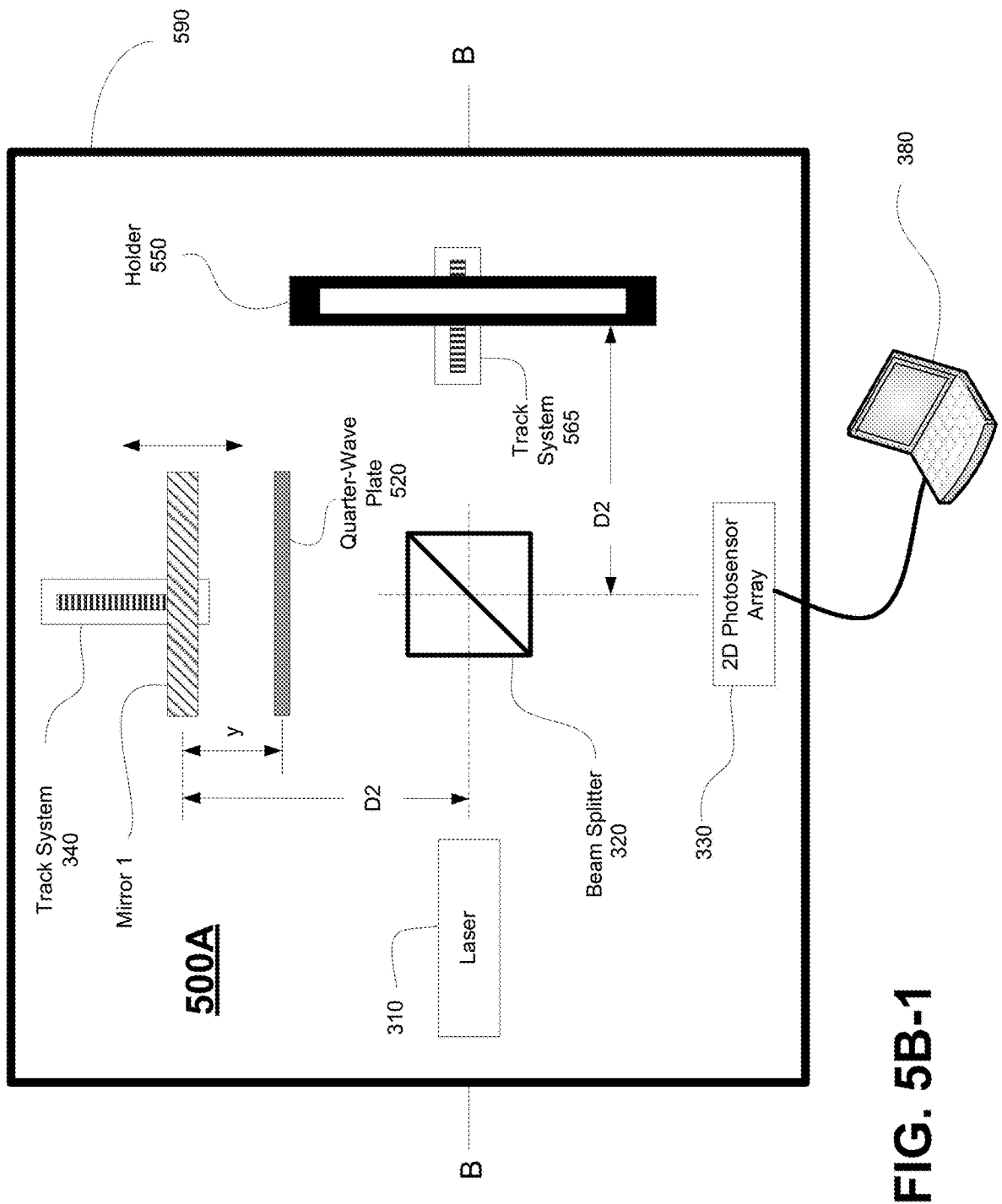

In particular, the 2D photosensor array 330 is configured to generate an interference fringe pattern 535. The reflected second light signal 511b may have a shift in phase when compared to the reflected first light signal 511a, wherein the shift in phase may be caused by a variation (e.g., non-uniformity) in the flatness in the display module 240, and more particularly the display layer 270 as translated to the polarizer 260-B of the circular polarizer 260. The interference fringe pattern or interferogram 535 provides an indication on whether there is a change in phase between the first light signal 511a (e.g., reflected off mirror 1 and double passing through quarter-wave plate 520) and the second light signal 511b (reflecting off the display module 240 and reflecting off the beam splitter 320) as received by the 2D photosensor array 330. That is, a phase variation between the first light signal 511a and the second light signal 511b as received by the 2D photosensor array 330 induces a disturbance in the resulting interferogram 535. In particular, a non-sinusoidal interference pattern indicates an abnormal change in phase (e.g., geometric phase variation) between a wavefront (e.g., first wavefront) of the reflected first light signal along the first path and a wavefront (e.g., second wavefront) of the reflected second light signal along the second path received by the beam splitter. That is, a non-uniform interference fringe pattern indicates a change in phase, which correlates to at least a variation in the flatness of the display module 240, and in particular, of the display layer 270 (as translated to the polarizer 260-B of the circular polarizer 260). In addition, a sinusoidal interference fringe pattern indicates no abnormal variation in phase between the reflected first light signal along the first path and the reflected second light signal along the second path received by the beam splitter. That is, a uniform interference fringe pattern indicates no abnormal variation in phase, which correlates to no variation in the flatness of the display module 240, and in particular no variation in the flatness of the display layer 270 (as translated to the polarizer 260-B of the circular polarizer 260). As such, the information extracted from the interferogram 535 gives an indication as to the amount of variation in the flatness (e.g., degree of flatness) of the display module 240, and more particularly the display layer 270 of display module 240. For example, sinusoidal interference patterns represent that there is phase change between the two paths, and if the pattern is uniform that is a normal change in phase between the wavefront of the reflected first light signal along the first path and the wavefront of the reflected second light signal along the second path. On the other hand, if the pattern is not uniform, this indicates abnormal change in phase due to material or geometric non-uniformity of the device FIG. 5B-1 is a top down view of the interferometer waviness detection system 500A of FIG. 5A that is configured to detect variation in flatness of a display module (e.g., the display layer in the module), in accordance with one embodiment of the present disclosure. The interferometer waviness detection system 500A as shown in FIGS. 5A and 5B-1 provides one configuration for detecting the variation in the flatness (e.g., degree of flatness) of the display module 240 (e.g., display layer 270). Other configurations are supported. For example, the display module may be located along the first path, and the mirror located on the second path. Consistent between any configuration of the interferometer waviness detection system 500A is that the physical distances between the beam splitter 320 and mirror 1, and between the beam splitter 320 and the display module (e.g., the polarizer 260-B of the circular polarizer 260) of the DUT are identical (e.g., distance D2).

As shown in FIG. 5B-1, the components of the interferometer waviness detection system 500A is located within support structure 590. For example, the support structure 390 may be a physical housing, or a surface. Mirror 1 may be located on a track system 340 so that the location of mirror 1 with respect to the beam splitter 320 may be adjusted (e.g., fine-tuned). Track system 340 may also provide for adjusting the orientation of mirror 1 with respect to the beam splitter. In particular, mirror 1 is located a distance D2 from the beam splitter, wherein the distance D2 is measured from the point of the beam splitter where the collimated light signal 511 originating from laser 310 is reflected (along the first path) or transmitted (along the second path), such as a center point of the beam splitter 320.

When aligned, both mirror 1 and the display module 240 (e.g., the polarizer 260-B of the circular polarizer 260) held by holder 550 are each separated from the beam splitter 320 by distance D2. That is, a first distance between the mirror and the beam splitter along the first path (e.g., as traveled by the first light signal) is equal to a second distance between the display module (e.g., the polarizer 260-B of the circular polarizer 260) and the beam splitter along the second path (e.g., as traveled by the second light signal). The distance D2 can be any value. For example, the distance D2 may be approximately 1 foot, or may be greater than 1 foot, or less than 1 foot. Because the distances D2 between mirror 1 and the display module 240 (e.g., the polarizer 260-B of the circular polarizer 260) and the beam splitter 320 are identical, no change in phase would be detected between wavefronts of the first light signal 511a and the second light signal 511b as received by the 2D photosensor array 330 when there is no variation in the flatness of the display module 240, or more specifically no variation in the flatness of the display layer 270 (translated to the polarizer 260-B of the circular polarizer 260) in display module 240.

In addition, the quarter-wave plate 520 is located along the first path between the beam splitter 320 and mirror 1. As shown, quarter-wave plate 520 may be fixed with respect to support structure 590. In other implementations, the position of quarter-wave plate 520 may be adjusted (e.g., located on a track system). The location of quarter-wave plate is not critical, and can be at any position between the beam splitter 320 and mirror 1. As shown, quarter-wave plate 520 is located at a distance "y" from mirror 1.

2D photosensor array 330 is configured to receive from the beam splitter 320 the reflected first light signal 511a double passing through the quarter-wave plate 520 along the first path merged with the reflected second light signal 511b, double passing through the quarter-wave plate 260-A and reflecting off the polarizer 260-B (e.g., polarizer layer), both included in the circular polarizer 260, along the second path, and generate an interference fringe pattern or interferogram 535. A computing device 380 may be coupled to the 2D photosensor array 330 in order to display, store, and/or analyze the interference fringe pattern 535. For example, computing device 380 may be coupled via a wired connection 381, or a wireless connection.

Figures 2, 5B:
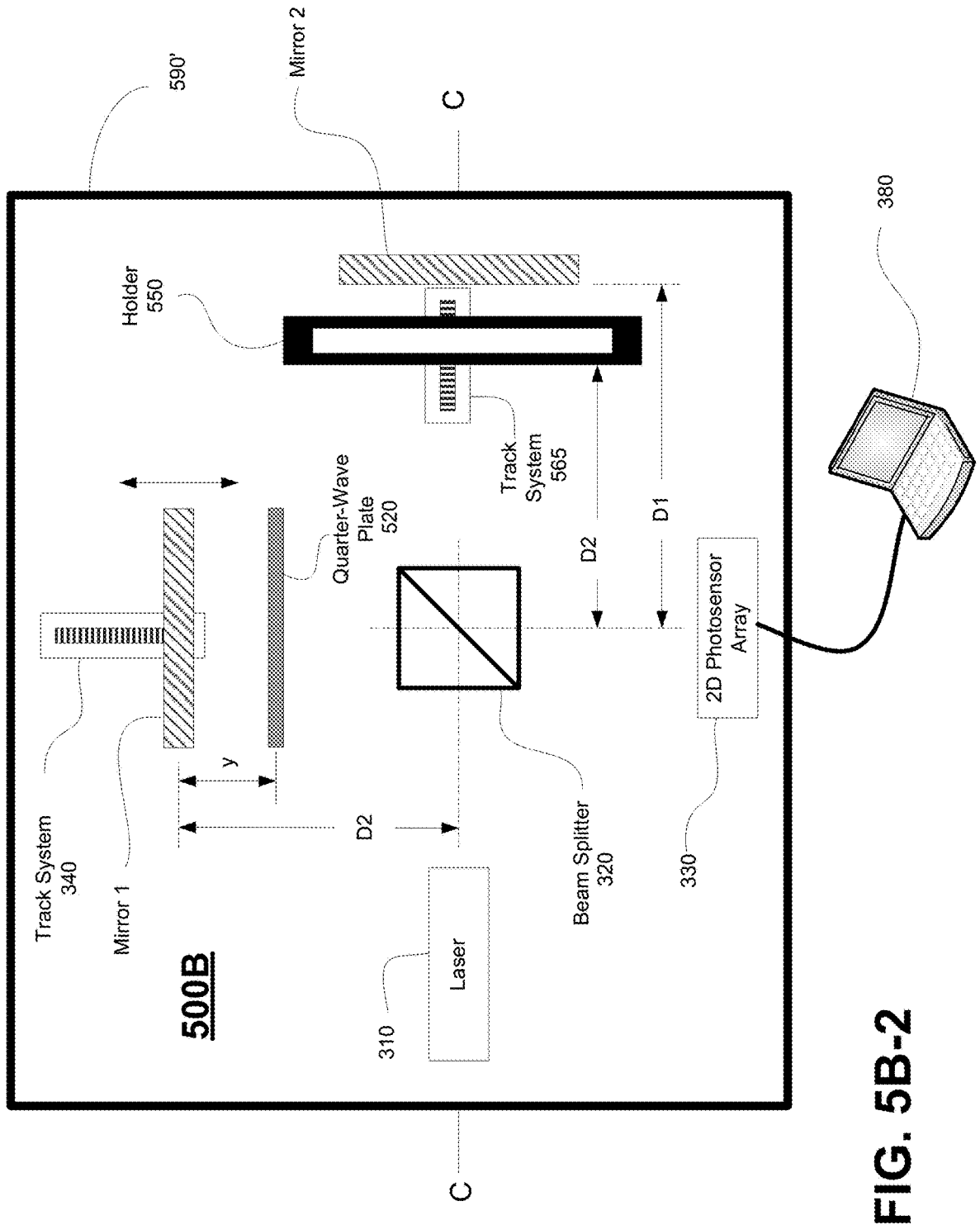

FIG. 5B-2 is a top down view of the interferometer waviness detection system 500 that is configured to detect flatness of a display module and/or a cover glass, in accordance with one embodiment of the present disclosure. FIG. 5B-2 is similar to FIG. 5B-1 except for the addition of mirror 2 in housing 590'. In particular, the interferometer waviness detection systems 300A and 500A may be configured within the same support structure 590'. For example, the interferometer waviness detection system 500B of FIG. 5B-2 may be configured as either interferometer waviness detection system 300A or interferometer waviness detection system 500A. As an illustration, track system 340 allows mirror 1 to be at a distance D1 from beam splitter 320 when configured as an interferometer waviness detection system 300A, or to be at a distance D2 from beam splitter 320 when configured as an interferometer waviness detection system 500A, wherein D1 is greater than D2. In particular, in the interferometer waviness detection system 300A configuration as implemented in housing 590', mirror 1 and mirror 2 are each located at distance D1 from beam splitter 320. In this configuration, holder 550 is configured to hold, support, and/or clasp the transparent material 250. Also, in the interferometer waviness detection system 500A configuration as implemented in housing 590', mirror 1 and the DUT having the display module 240 (e.g., polarizer 260-B of circular polarizer 260) are each located at distance D2 from the beam splitter 320, wherein the holder 550 holding the DUT is configured to locate the display module 240 (e.g., polarizer 260-B of circular polarizer 260 within display module 240) of DUT at distance D2 from beam splitter 320. Holder 550 may interact or interface with track system 565 to position the DUT. Holder 550 is configured for holding, supporting, and/or clasping the DUT. As such, holder 550 is located on the second path, and more particularly, movably located between beam splitter 320 and mirror 2.

Figures 1, 5C:
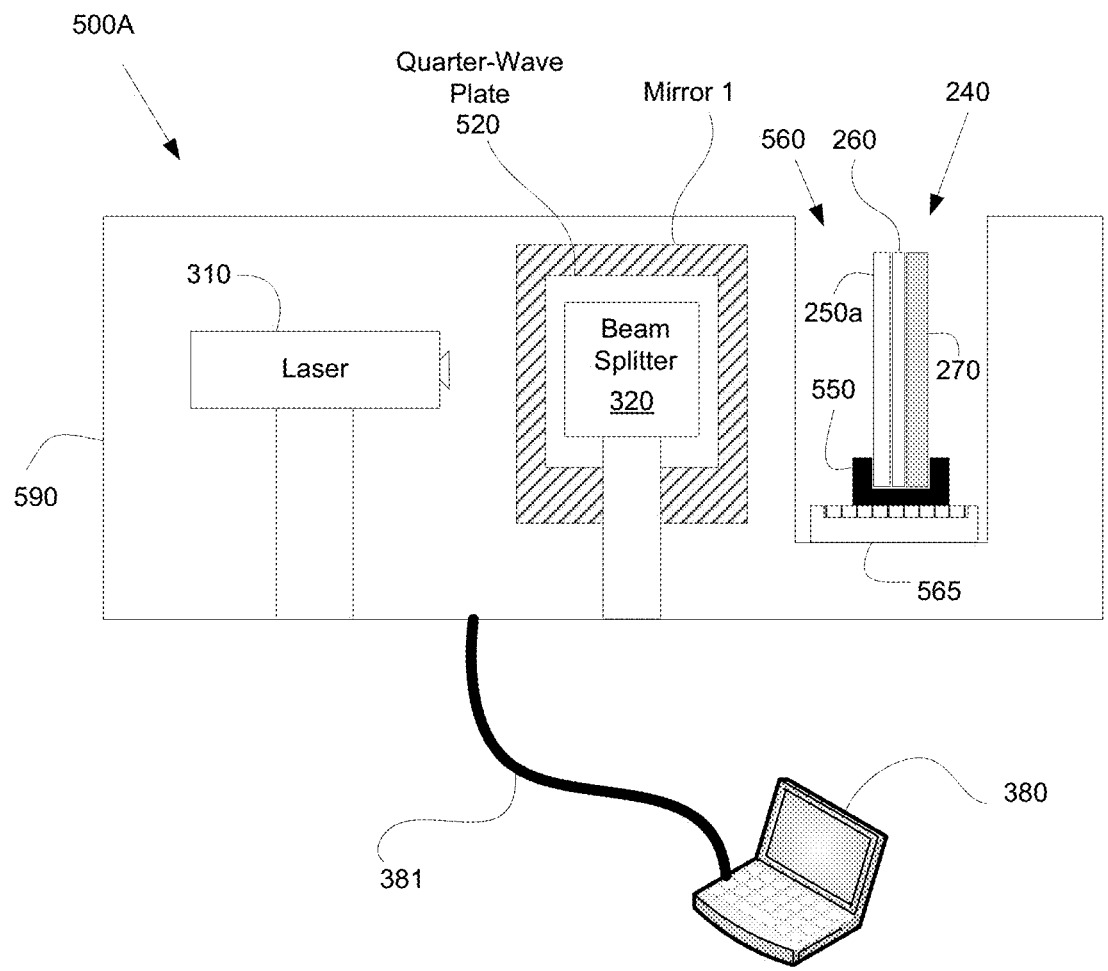
Figures 2, 5C:
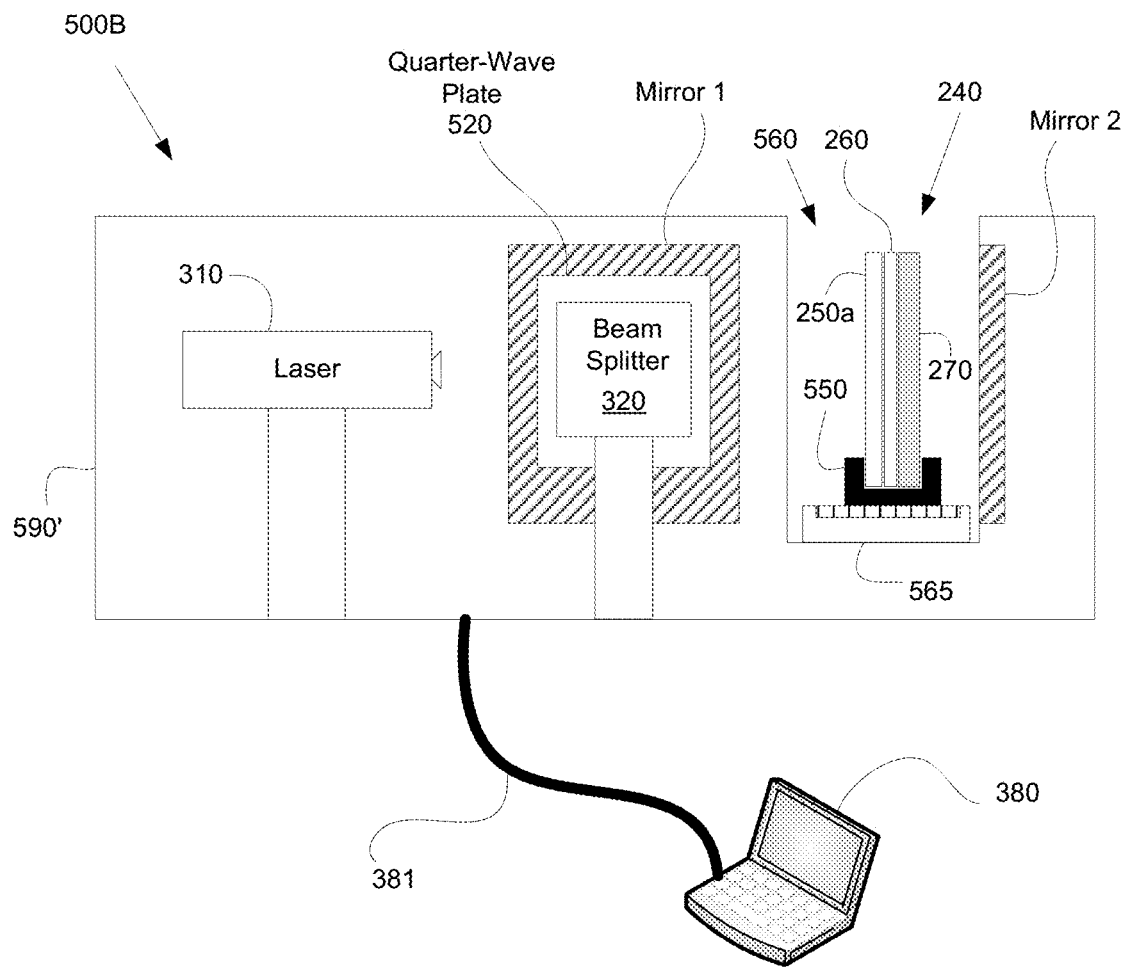

FIG. 5C-1 illustrates a cutaway view of the interferometer waviness detection system 500A of FIGS. 5A and 5B-1 taken along a line drawn between points B-B of FIG. 5B-1, in accordance with one embodiment of the present disclosure. As shown in FIG. 5C-1, the interferometer waviness detection system 500A may be enclosed and/or supported in support structure 590, as previously introduced. In particular, a collimated light signal originating from light source 310 (e.g., laser) is provided to the beam splitter 320, which splits the collimated light signal to a first light signal and a second light signal. The first light signal travels along a first path via a quarter-wave plate 520 to be reflected off mirror 1 before returning back to the beam splitter 320 (after passing again through quarter-wave plate 520). The second light signal travels along a second path to pass through the quarter-wave plate 260-A of circular polarizer 260, reflect off the polarizer 260-B of the circular polarizer 260, and then double pass through the quarter-wave plate 260-A again before returning back to the beam splitter 320. As shown, the display module 240 is held, supported, and/or clasped by holder 550. Also, holder 550 may be located on a track system 565, such that the display module 240 is movably positioned within the interferometer waviness detection system 500A. A 2D photosensor array is configured to receive from the beam splitter 320 the reflected first light signal double passing through the quarter-wave plate 520 (and reflecting off mirror 1) merged with the reflected second light signal double passing through the quarter-wave plate 260-A of the circular polarizer 260 (and reflecting off the polarizer 260-B) and generate an interference pattern (e.g., interference fringe pattern or interferogram). Computing device 380 may be coupled to the 2D photosensor array 330 (e.g., wired or wireless connection, etc.) in order to display, store, and/or analyze the interference fringe pattern.

FIG. 5C-2 illustrates a cutaway view of the interferometer waviness detection system 500B of FIG. 5B-2 taken along a line drawn between points C-C of FIG. 5B-2, in accordance with one embodiment of the present disclosure. FIG. 5C-2 is similar to FIG. 5C-1 except for the addition of mirror 2 in housing 590'. In particular, the interferometer waviness detection systems 300A and 500A may be configured within the same support structure 590' shown in FIG. 5C-2 and as previously described in relation to FIG. 5B-2.

Figure 6:
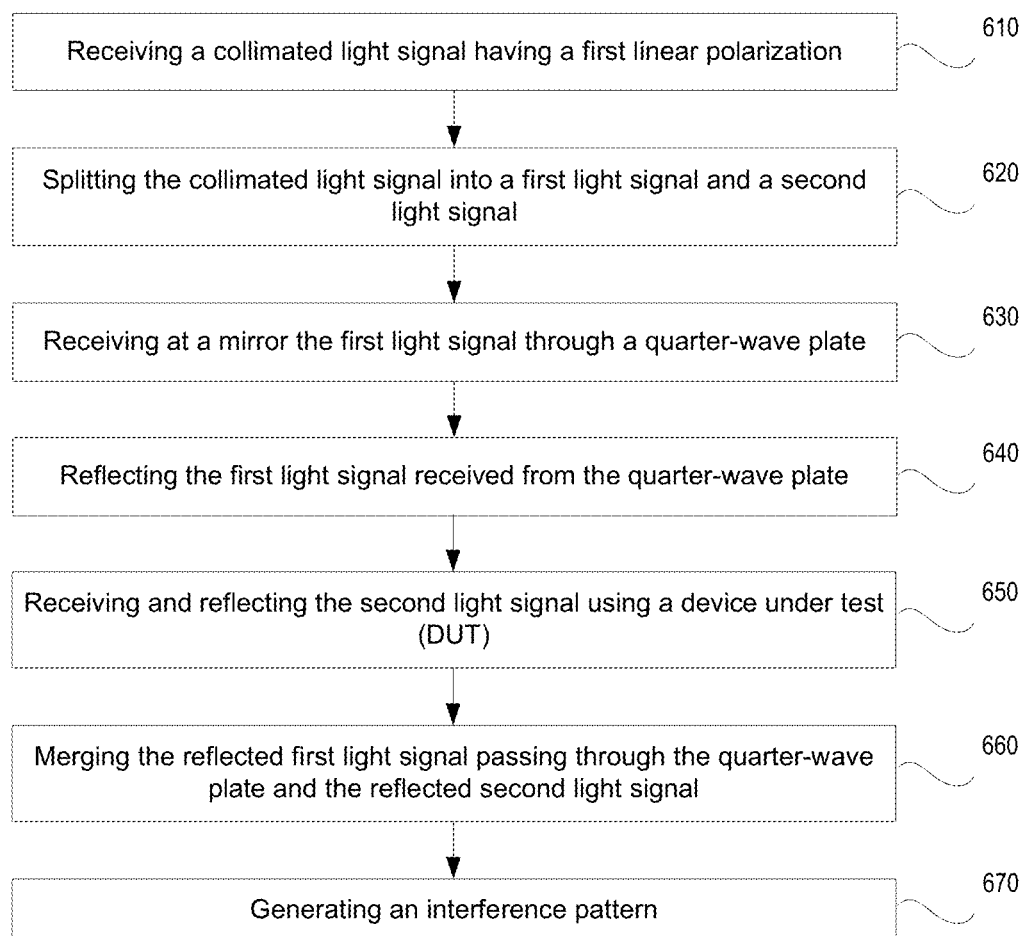
FIG. 6 is a flow diagram illustrating a method for measuring variation in flatness, or variation in thickness, or variation in refractivity of a display module, in accordance with one embodiment of the present disclosure.

FIG. 6 is a flow diagram illustrating a method for measuring variation in flatness of a display module, in accordance with one embodiment of the present disclosure. Flow diagram 600 may be implemented by the interferometer waviness detection system 500A of FIGS. 5A and 5B-1 and/or interferometer waviness detection system 500B of FIG. 5B-2, in embodiments to detect any waviness (e.g., non-uniformity and/or variation in flatness) of a display module, and more particularly a display layer of the display module.

At 610, the method includes receiving a collimated light signal at a beam splitter. The collimated light signal may originate from a light source, such as a laser providing a coherent beam of light, which is then collimated. The collimated light signal has a first linear polarization (e.g., linear P polarization, linear S polarization, etc.). The collimated light signal having a first linear polarization is received by the beam splitter, which then splits the collimated light signal at 620 into a first light signal and a second light signal. For example, the first light signal and the second light signal are substantially identical, in one embodiment. The first light signal travels along a first path, and the second light signal travels along a second path.

At 630, the method includes receiving the first light signal at a mirror after passing through a quarter-wave plate. The quarter-wave plate may be located along the first path between the beam splitter and the mirror. The first light signal may be configured as a reference signal. At 640, the first light signal passing through the quarter-wave plate is reflected off the mirror along the first path.

At 650 the method includes receiving the second light signal at an assembled display module of a DUT. In one implementation, the assembled display module includes a cover glass/touch panel, a circular polarizer (which consists of a quarter-wave plate and a polarizer), and a display layer. The polarizer of the circular polarizer acts as a reflector or mirror. As such, the second light signal after passing through the quarter-wave plate of the circular polarizer is reflected off the polarizer (e.g., polarizer layer) of the circular polarizer of the DUT along the second path.

At 660, the method includes merging using the beam splitter the reflected first light signal double passing through the quarter-wave plate traveling along the first path (after reflection off mirror 1) and the reflected second light signal double passing through the quarter-wave plate of the circular polarizer along the second path (after reflection off polarizer of the circular polarizer). The reflected first light signal received at the beam splitter has a second linear polarization (e.g., linear S polarization) that is rotated by ninety degrees from the first linear polarization (e.g., linear P polarization) of the collimated light signal 511. In one embodiment, the reflected second light signal double passes through a quarter-wave plate of a circular polarizer of a display module (after reflection off the polarizer of the circular polarizer). In particular, the second light signal is received at the display module from the beam splitter after double passing through the quarter wave plate of the circular polarizer and reflecting off the polarizer of the circular polarizer before reaching the beam splitter. The reflected second light signal received at the beam splitter also has the second linear polarization (e.g., linear S polarization). That is, the reflected first light signal and the reflected second light signal have the same state of polarization when received by beam splitter and delivered to the sensor plane of the 2D photosensor array.

At 670, the method includes generating an interference pattern (e.g., interference fringe pattern) from the reflected first light signal merged with the reflected second light signal. For example, a 2D photosensor array is configured to receive the reflected first light signal merged with the reflected second light signal and sense and/or detect the merged light signals, such that the interference pattern may be generated. The interference pattern may be an interference fringe pattern or interferogram.

In particular, the interference pattern may show any change in phase between the reflected first light signal double passing through the quarter-wave plate along the first path and the reflected second light signal double passing through the quarter-wave plate of the circular polarizer of the display module along the second path. Any phase variation between the reflected first light signal the reflected second light signal induces a disturbance in the interference pattern. In particular, a non-sinusoidal or non-uniform interference pattern indicates a geometrical phase variation (e.g., change in phase) between the wavefronts of the reflected first light signal and the reflected second light signal received at the beam splitter. The change in phase may be caused by a variation in flatness of the display module (e.g., display layer of display module). Also, a sinusoidal or uniform interference pattern indicates no abnormal variation in phase between the reflected first light signal and the reflected second light signal received at the beam splitter. That is, no abnormal variation in phase indicates that there is uniform flatness of the display module (e.g., display layer of display module).

Figure 7C:
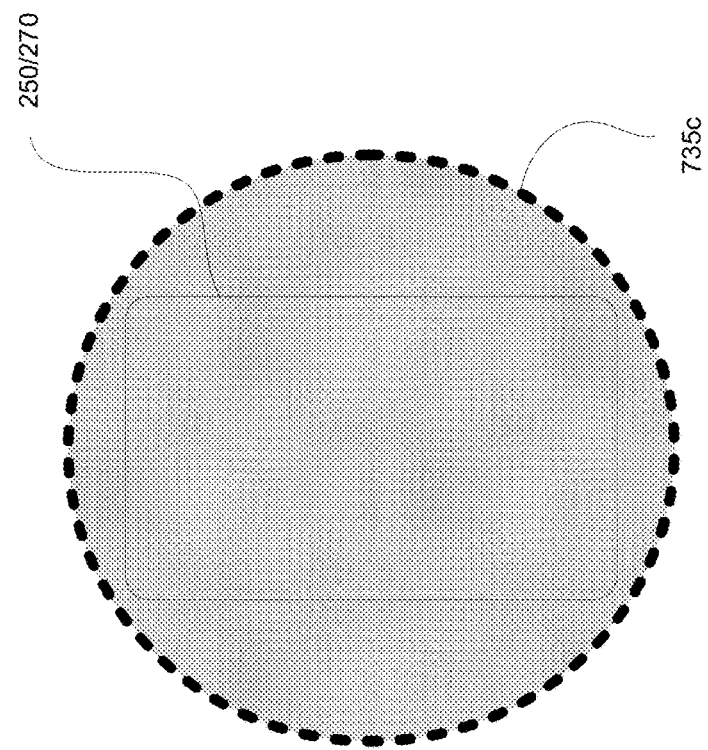
FIGS. 7A-7C illustrate various coverage areas of interference fringe patterns detecting flatness of a transparent optical material and/or a display module, in accordance with embodiments of the present disclosure.
Figure 7B:
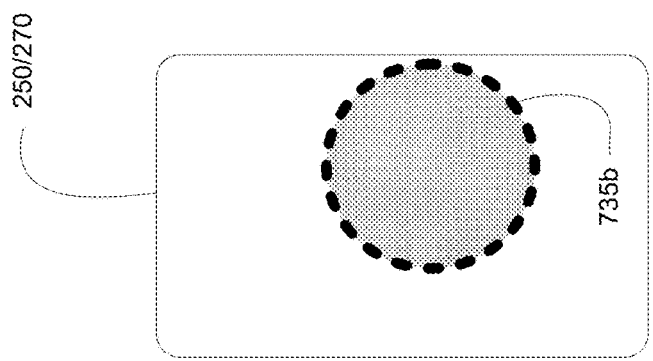
Figure 7A:
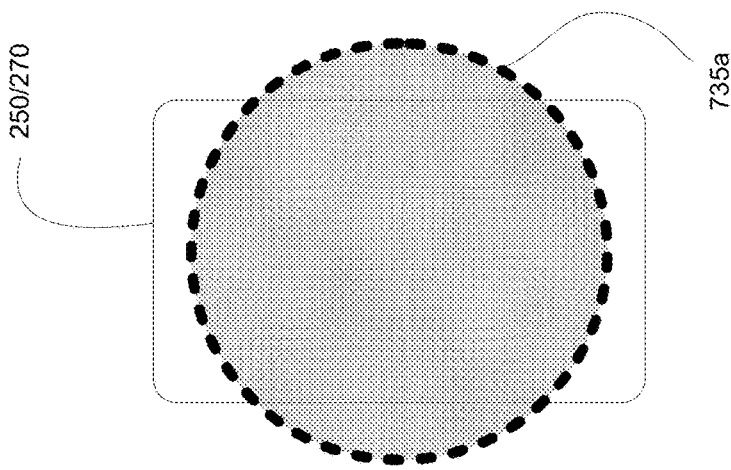

FIGS. 7A-7C illustrate various coverage areas of interference fringe patterns detecting flatness of a transparent optical material and/or a display module, in accordance with embodiments of the present disclosure.

For example, FIG. 7A illustrates an interference fringe pattern 735a that is configured to detect and/or measure a variation in flatness, or variation in thickness, or variation in refractivity of a transparent material 250, wherein the interference fringe pattern 735a covers most of the surface area of the transparent material 250. Also, FIG. 7A illustrates an interference fringe pattern 735a that is configured to detect and/or measure a variation in flatness in a display module (e.g., display layer 270 of the display module), wherein the interference fringe pattern 735a covers most of the surface area of the display model 240 (e.g., most of display layer 270 of display module 240).

FIG. 7B illustrates an interference fringe pattern 735b that is configured to detect and/or measure a variation in flatness, or variation in thickness, or variation in refractivity of a transparent material 250, wherein the interference fringe pattern 735b covers a small portion of the overall surface area of the transparent material 250. Also, FIG. 7B illustrates an interference fringe pattern 735b that is configured to detect and/or measure a variation in flatness in a display module (e.g., display layer 270 of the display module), wherein the interference fringe pattern 735b covers a small portion of the overall surface area of the display module (e.g., display layer 270 of the display module).

FIG. 7C illustrates an interference fringe pattern 735c that is configured to detect and/or measure a variation in flatness, or variation in thickness, or variation in refractivity of a transparent material 250, wherein the interference fringe pattern 735c covers the entirety of the overall surface area of the transparent material 250. Also, FIG. 7C illustrates an interference fringe pattern 735c that is configured to detect and/or measure a variation in flatness in a display module (e.g., display layer 270 of the display module), wherein the interference fringe pattern 735c covers the entirety of the overall surface area of the display module (e.g., display layer 270 of the display module).

FIGS. 8A-8F illustrate multiple interferograms providing simulated interference fringe patterns that detects and/or measures the variation in flatness, or variation in thickness, or variation in refractivity of a transparent optical material (e.g., cover glass/touch panel), or display module, in embodiments. In one implementation, each of the interference fringe patterns shown in FIGS. 8a-8F correlates to a corresponding contour of a surface of the tested material (e.g., transparent material 250, or assembled display module 240 of the DUT, or display layer 270 of the assembled display module 240 of the DUT). In a corresponding interference fringe pattern, it may be determined that there is a change in phase between the reflected first light signal along the first path and the reflected second light signal in either the interferometer waviness detection system 300A or the interferometer waviness detection system 500A when there is more than one peak or valley in the interference pattern.

Figure 8C:
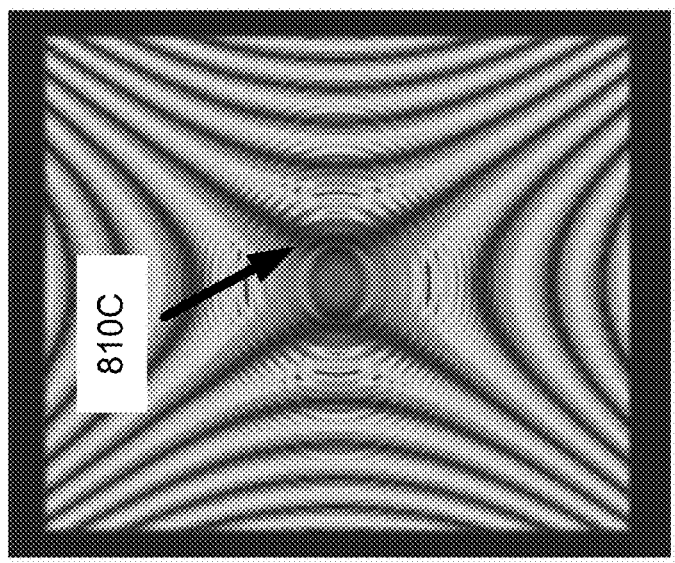
FIGS. 8A-8F illustrate multiple interferogram interference fringe patterns measuring the flatness of a transparent optical material (e.g., cover glass) or display module, in embodiments.
Figure 8B:
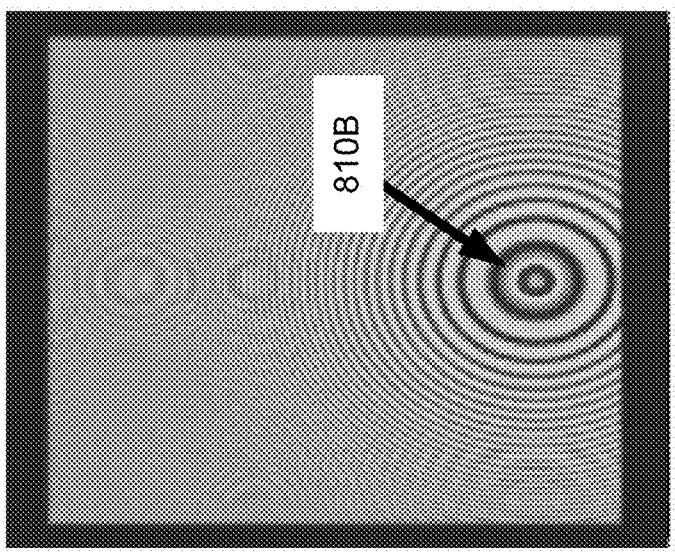
Figure 8A:
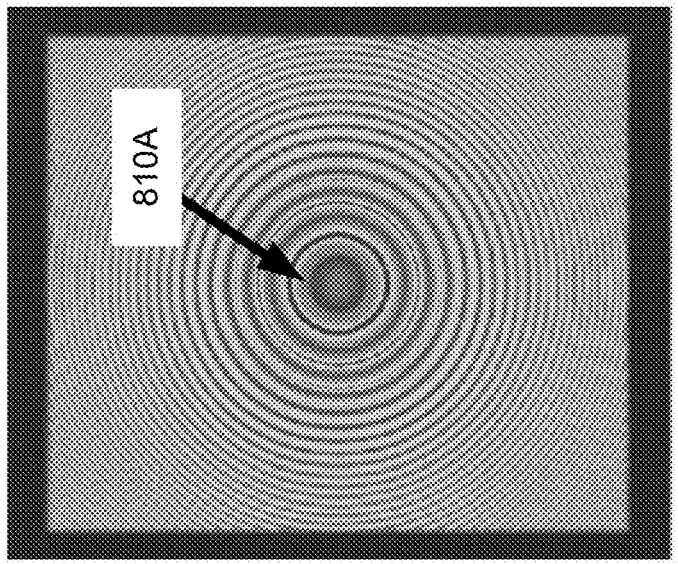

In particular, FIG. 8A illustrates an interference fringe pattern exhibiting uniform phase variation, wherein the phase from the light signal varies uniformly thereby generating one nice peak 810A. That is, the interference fringe pattern of FIG. 8A is uniform (e.g., exhibiting uniform phase variation between fringes), wherein each fringe represents one wavelength phase variation. Also, the interference fringe pattern has one peak 810A (or valley), which exhibits uniformity of the fringe pattern off the peak in any direction. This indicates good results for the corresponding transparent material or display module (e.g., display layer of the display module).

FIG. 8B illustrates an interference fringe pattern exhibiting a phase variation. Although the interference fringe pattern of FIG. 8B is uniform (e.g., exhibiting uniform phase variation between fringes), wherein each fringe represents one wavelength phase variation, the peak 810B is off-shifted from the center of the interference fringe pattern. This indicates poor results for the corresponding transparent material or display module (e.g., display layer of the display module).

FIG. 8C illustrates an interference fringe pattern exhibiting a phase variation. The interference fringe pattern of FIG. 8C shows an X-shaped valley 810C instead of uniform peak. This indicates poor results for the corresponding transparent material or display module (e.g., display layer of the display module).

Figure 8F:
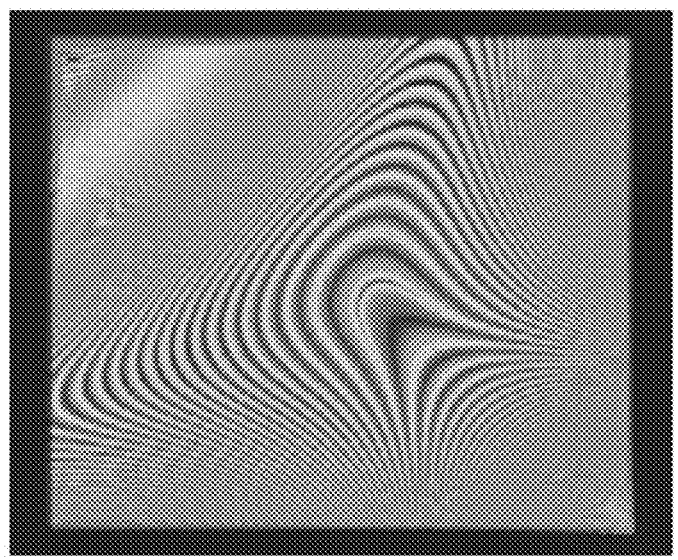
Figure 8E:
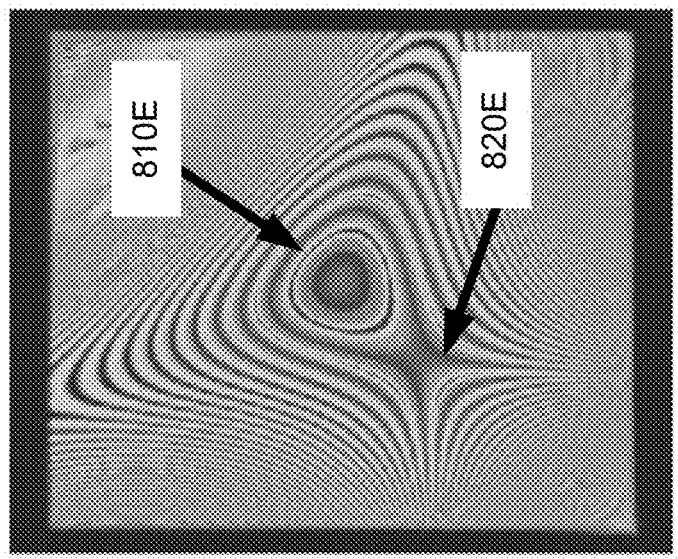
Figure 8D:
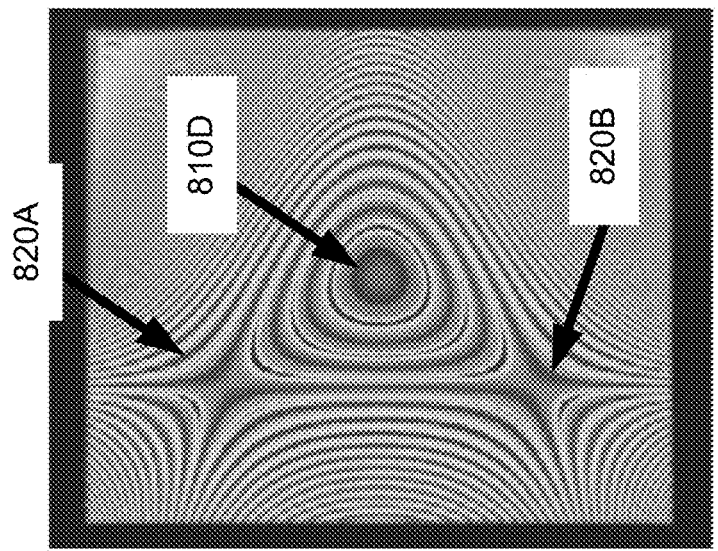

FIG. 8D illustrates an interference fringe pattern exhibiting a phase variation. The interference fringe pattern of FIG. 8D shows multiple peaks and/or valleys. In particular, the interference fringe pattern shows an X-shaped valley 810D, and at least two X-shaped valleys 820A and 820B. This indicates poor results for the corresponding transparent material or display module (e.g., display layer of the display module).

FIG. 8E illustrates an interference fringe pattern exhibiting a phase variation. The interference fringe pattern of FIG. 8E shows a non-uniform fringe pattern, wherein each fringe represents one wavelength phase variation. In particular, there is non-uniform phase variation between fringes. Also, the interference fringe pattern of FIG. 8E shows both a peak 810E and a valley 820E. This indicates poor results for the corresponding transparent material or display module (e.g., display layer of the display module).

FIG. 8F illustrates an interference fringe pattern exhibiting a phase variation. The interference fringe pattern of FIG. 8F shows a non-uniform fringe pattern, wherein each fringe represents one wavelength phase variation. In particular, there is non-uniform phase variation between fringes. Also, the interference fringe pattern of FIG. 8F does not show either a distinctive peak or valley. This indicates poor results for the corresponding transparent material or display module (e.g., display layer of the display module).

Figure 9:
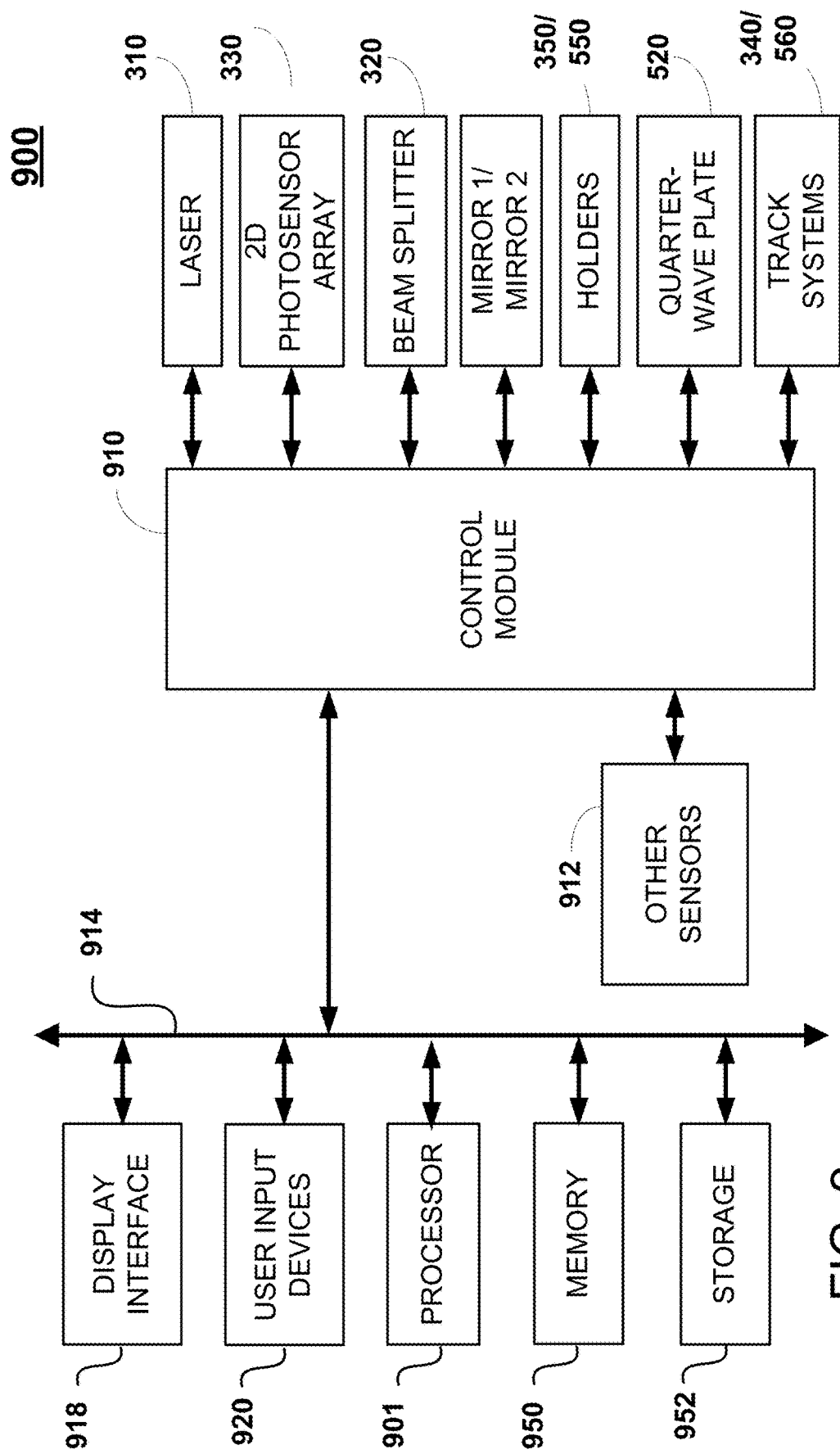
FIG. 9 shows a control module for controlling the systems described above, in accordance with embodiments of the present disclosure.

FIG. 9 shows a control module 910 for controlling the systems described above. Control module 910 may be configured within an example device used to perform aspects of the various embodiments of the present disclosure. For example, FIG. 9 illustrates an exemplary hardware system 900 suitable for implementing a device in accordance with one embodiment. Hardware system 900 may be a computer system suitable for practicing embodiments of the disclosure, and may include processors, memory, and one or more interfaces. In particular, hardware system 900 includes a central processing unit or processor 901 for running software applications and optionally an operating system. Processor 901 may be one or more general-purpose microprocessors having one or more processing cores. Further, system 900 may include memory 950 for storing applications and data for use by processor 901. Storage 952 provides non-volatile storage and other computer-readable media for applications and data, and may include fixed disk drives, removable disk drives, flash memory devices, and CD-ROM, DVD-ROM, Blu-ray, HD-DVD, or other optical devices, as well as signal transmission and storage media. The components of system 900 are connected via one or more data buses 914.

The control module 900 may be employed to control devices in the system based in part on sensed values. For example only, the control module 900 may control one or more of coherent laser 310, 2D photosensor array 330, beam splitter 320, mirror 1, mirror 2, holder 350, holder 550, quarter wave plate 520, circular polarizer (not shown), track system 340, track system 560, and other sensors 912 based on the sensed values and other control parameters. The control module 900 will typically include one or more memory devices and one or more processors. Other computer programs stored on memory devices associated with the control module 900 may be employed in some embodiments.

There will typically be a user interface associated with the control module 900. The user interface may include a display interface 918 configured for providing instructions to a display screen and/or graphical software displays of the testing systems, and user input devices 920 such as pointing devices, keyboards, touch screens, microphones, etc., which are used to communicate user inputs to the system 900.

In some implementations, a controller is part of a system, which may be part of the above-described examples. Such systems can comprise testing systems. All of these systems may be integrated with electronics for controlling their operation before, during, and after testing. The electronics may be referred to as the "controller," which may control various components or subparts of the system or systems. The controller, depending on the processing requirements and/or the type of system, may be programmed to control any of the processes disclosed herein.

Broadly speaking, the controller may be defined as electronics having various integrated circuits, logic, memory, and/or software that receive instructions, issue instructions, control operation, enable cleaning operations, enable end-point measurements, and the like. The integrated circuits may include chips in the form of firmware that store program instructions, digital signal processors (DSPs), chips defined as application specific integrated circuits (ASICs), and/or one or more microprocessors, or microcontrollers that execute program instructions (e.g., software). Program instructions may be instructions communicated to the controller in the form of various individual settings (or program files).

The controller, in some implementations, may be a part of or coupled to a computer that is integrated with, coupled to the system, otherwise networked to the system, or a combination thereof. For example, the controller may be in the "cloud" of all or a part of a fab host computer system, which can allow for remote access for testing. In some examples, a remote computer (e.g., a server) can provide testing processes to a system over a network, which may include a local network or the internet.

The remote computer may include a user interface that enables entry or programming of parameters and/or settings, which are then communicated to the system from the remote computer. In some examples, the controller receives instructions in the form of data, which specify parameters for each of the processing steps to be performed during one or more operations. It should be understood that the parameters may be specific to the type of process to be performed and the type of tool that the controller is configured to interface with or control. Thus as described above, the controller may be distributed, such as by comprising one or more discrete controllers that are networked together and working towards a common purpose, such as the processes and controls described herein. An example of a distributed controller for such purposes would be one or more integrated circuits on a chamber in communication with one or more integrated circuits located remotely (such as at the platform level or as part of a remote computer) that combine to control a process on the chamber.

As noted above, depending on the process step or steps to be performed by the tool, the controller might communicate with one or more of other tool circuits or modules, other tool components, cluster tools, other tool interfaces, adjacent tools, neighboring tools, tools located throughout a factory, a main computer, another controller, etc.

The following show a few additional embodiments which can be combined or integrated with the existing disclosed embodiments of FIGS. 1-9 and/or embodiments disclosed in the claims, or provide modifications that may cover other embodiments generated by combining the below disclosure with the existing disclosed embodiments of FIGS. 1-9 and/or embodiments disclosed in the claims.

A1. A method for measuring flatness, in accordance with one embodiment of the present disclosure. The method includes receiving a collimated light signal at a beam splitter. The method includes splitting using the beam splitter the collimated light signal into a first light signal traveling along a first path and a second light signal traveling along a second path. The method includes receiving the first light signal and reflecting the first light signal along the first path using a first mirror. The method includes receiving at a second mirror the second light signal passing through a transparent material located along the second path between the beam splitter and the second mirror. The method includes reflecting the second light signal received from the transparent material along the second path using the second mirror. The method includes merging using the beam splitter the reflected first light signal traveling along the first path and the reflected second light signal double passing through the transparent material along the second path. The method includes generating an interference fringe pattern from the reflected first light signal merged with the reflected second light signal. In the method, a non-sinusoidal interference fringe pattern indicates geometric phase variation between a first wavefront of the reflected first light signal traveling along the first path and a second wavefront of the reflected second light signal double passing through the transparent material along the second path.

A2. In accordance with another embodiment of the present disclosure, the method further includes setting a first distance between the first mirror and the beam splitter along the first path to be equal to a second distance between the second mirror and the beam splitter along the second path.

A3. In accordance with another embodiment of the present disclosure, the method further includes determining a change in phase between the first wavefront of the reflected first light signal along the first path and the second wavefront of the reflected second light signal double passing through the transparent material along the second path is caused by a variation in thickness of the transparent material or a variation in refractivity across the transparent material.

A4. Further, in the method, the transparent material comprises a cover glass for a display module, in accordance with one embodiment of the present disclosure.

A5. In accordance with another embodiment of the present disclosure, the method further includes receiving at the second mirror the second light signal from the beam splitter and through the transparent material. The method includes reflecting off the second mirror the received second light signal. The method includes receiving at the beam splitter the reflected second light signal double passing through the transparent material.

A6. In accordance with another embodiment of the present disclosure, the method further includes determining that there is a change in phase between the first wavefront of the reflected first light signal along the first path and the second wavefront of the reflected second light signal double passing through the transparent material along the second path when there is more than one peak or valley in the interference fringe pattern.

A7. In the method, a plane of the transparent material is non-parallel to a plane of the mirror, in accordance with one embodiment of the present disclosure.

A8. In the method, a plane of the transparent material is parallel to a plane of the mirror, in accordance with one embodiment of the present disclosure.

A9. In accordance with another embodiment of the present disclosure, the method further includes placing the transparent material at any point between the beam splitter and the second mirror along the second path.

A10. In the method, a sinusoidal interference fringe pattern indicates no abnormal variation in phase between the first wavefront of the reflected first light signal along the first path and the second wavefront of the reflected second light signal double passing through the transparent material along the second path, in accordance with one embodiment of the present disclosure.

A11. In accordance with another embodiment of the present disclosure, the method further includes generating a light signal. The method includes collimating the light signal to produce the collimated light signal.

B1. A method for measuring flatness, in accordance with one embodiment of the present disclosure. The method includes receiving a collimated light signal having a first linear polarization at a beam splitter. The method includes splitting using the beam splitter the collimated light signal into a first light signal traveling along a first path and a second light signal traveling along a second path. The method includes receiving at a mirror the first light signal through a first quarter-wave plate located along the first path between the beam splitter and the mirror. The method includes reflecting the first light signal received from the first quarter-wave plate along the first path using the mirror. The method includes receiving the second light signal and reflecting the second light signal along the second path using a display module of a device under test (DUT). The method includes merging using the beam splitter the reflected first light signal double passing through the quarter-wave plate along the first path and the reflected second light signal traveling along the second path. The method includes generating an interference fringe pattern from the reflected first light signal merged with the reflected second light signal. In the method, a non-sinusoidal interference fringe pattern indicates a geometric phase variation between the reflected first light signal along the first path and the reflected second light signal along the second path received by the beam splitter.

B2. In the method, the display module includes a circular polarizer including a second quarter-wave plate and a polarizer, and a display layer configured for displaying pixel images.

B3. In the method, the display layer includes a liquid-crystal display (LCD), or light emitting diode (LED) display, or an organic light emitting diode (OLED) display.

B4. In accordance with another embodiment of the present disclosure, the method further includes receiving at the mirror the first light signal via the first quarter-wave plate. The method includes reflecting off the mirror the received first light signal. The method includes receiving the reflected first light signal double passing through the first quarter-wave plate at the beam splitter, wherein the reflected first light signal received at the beam splitter has a second linear polarization that is rotated by ninety degrees from the first linear polarization. The method includes receiving from the beam splitter at the polarizer the second light signal passing through the second quarter-wave plate of the circular polarizer. The method includes reflecting off the polarizer the received second light signal. The method includes receiving at the beam splitter the reflected second light signal double passing through the second quarter-wave plate circular polarizer and having the second linear polarization.

B5. In accordance with another embodiment of the present disclosure, the method further includes setting a first distance between the mirror and the beam splitter along the first path to be equal to a second distance between the polarizer of the circular polarizer and the beam splitter along the second path.

B6. In the method, a change in phase between the first light signal traveling along the first path and the second light signal traveling along the second path is caused by a variation in flatness of the display module.

B7. In accordance with another embodiment of the present disclosure, the method further includes determining a change in phase between the reflected first light signal and the reflected second light signal when there is more than one peak or valley in the interference fringe pattern.

B8. In the method, the beam splitter comprises a non-polarizing beam splitter.

B9. In the method, a sinusoidal interference fringe pattern indicates no abnormal variation in phase between the reflected first light signal along the first path and the reflected second light signal along the second path received by the beam splitter.

B10. In accordance with another embodiment of the present disclosure, the method further includes generating a light signal. The method includes collimating the light signal to produce the collimated light signal.

The foregoing description of the embodiments has been provided for purposes of illustration and description. It is not intended to be exhaustive or to limit the disclosure. Individual elements or features of a particular embodiment are generally not limited to that particular embodiment, but, where applicable, are interchangeable and can be used in a selected embodiment, even if not specifically shown or described. The same may also be varied in many ways. Such variations are not to be regarded as a departure from the disclosure, and all such modifications are intended to be included within the scope of the disclosure.

Although the foregoing embodiments have been described in some detail for purposes of clarity of understanding, it will be apparent that certain changes and modifications can be practiced within the scope of the appended claims. Accordingly, the present embodiments are to be considered as illustrative and not restrictive, and the embodiments are not to be limited to the details given herein but may be modified within their scope and equivalents of the claims.

What is claimed is:

1. An interferometer detection system, comprising:
   a beam splitter configured to receive a collimated light signal and split the collimated light signal into a first light signal traveling along a first path and a second light signal traveling along a second path;
   a first mirror configured to receive and reflect the first light signal along the first path;
   a device under test comprising:
     a touch panel disposed on a front surface of the device under test, the touch panel comprising a transparent optical material having a thickness, a flatness and a refractive index across an area thereof;
     a digital display disposed rearward of the touch panel, the digital display comprising a second mirror configured to receive and reflect the second light signal along the second path via the transparent optical material that is located along the second path between the beam splitter and the second mirror; and
     a case which encloses the digital display and frames the touch panel; and
   a 2D photosensor array configured to receive from the beam splitter the reflected first light signal along the first path merged with the reflected second light signal double passing through the transparent optical material along the second path and generate an interference fringe pattern;
   wherein the beam splitter, first mirror, second mirror and 2D photosensor array are configured and arranged to provide one of a non-sinusoidal interference fringe pattern and a sinusoidal interference fringe pattern,
     the non-sinusoidal interference fringe pattern being provided when a non-uniformity in is present in the transparent optical material, the non-uniformity being found in at least one of the flatness, the thickness and the refractive index of the transparent optical material, the non-sinusoidal interference fringe pattern arising from geometrical variation between a first wavefront of the reflected first light signal along the first path and a second wavefront of the reflected second light signal double passing through the transparent optical material along the second path,
     the sinusoidal interference fringe pattern being provided when the non-uniformity is not present in the transparent optical material, the sinusoidal interference fringe pattern arising from the absence of geometrical variation between the first and second wavefronts.

2. The interferometer detection system of claim 1, wherein a first distance between the first mirror and the beam splitter along the first path is equal to a second distance between the second mirror and the beam splitter along the second path.

3. The interferometer detection system of claim 1, wherein the second light signal travels from the beam splitter and through the transparent optical material before reflecting off the second mirror and double passes through the transparent optical material before reaching the beam splitter.

4. The interferometer detection system of claim 1, wherein a change in phase between the first wavefront of the reflected first light signal along the first path and the second wavefront of the reflected second light signal double passing through the transparent optical material along the second path is indicated by more than one peak or valley in the interference fringe pattern.

5. The interferometer detection system of claim 1, wherein a plane of the transparent optical material is parallel to a plane of the second mirror.

6. The interferometer detection system of claim 1, wherein a sinusoidal interference fringe pattern indicates no abnormal variation in phase between the first wavefront of the reflected first light signal along the first path and the second wavefront of the reflected second light signal double passing through the transparent optical material along the second path.

7. The interferometer detection system of claim 1, further comprising:
   a light source generating a light signal that is collimated to produce the collimated light signal.

8. The interferometer detection system of claim 1, further comprising:
   a first quarter-wave plate positioned between the first mirror and the beam splitter; and
   a second quarter-wave plate positioned between the second mirror and the beam splitter.

9. The interferometer detection system of claim 8, wherein the device under test also includes a circular polarizer, disposed between the touch panel and the digital display.

10. The interferometer detection system of claim 9, wherein the circular polarizer further includes the second quarter-wave plate, and a polarizer.

11. The interferometer detection system of claim 1, further comprising a computing device coupled to the 2D photosensor array, the computing device programmed to analyze the interference fringe pattern and, based on whether the sinusoidal interference fringe pattern is sinusoidal or non-sinusoidal, to provide an indication of the non-uniformity of the transparent optical material.

12. The interferometer detection system of claim 1, wherein the device under test is configured to display images.

13. The interferometer detection system of claim 12, wherein the device under test comprises the transparent optical material, a display layer configured to display pixel images, and a circular polarizer.

14. The interferometer detection system of claim 1, wherein the non-sinusoidal interference fringe pattern includes at least one irregularity indicative of the non-uniformity, the at least one irregularity including more than one peak or valley, a peak off-shifted from the center of the interference fringe pattern, an X-shaped valley instead of a uniform peak, at least two X-shaped valleys, or a non-uniform phase variation between fringes.

15. The interferometer detection system of claim 1, wherein the device under test comprises a circuit board and a battery contained within the case.

* * * * *